United States Patent
Sonoda et al.

[11] Patent Number: 6,129,961
[45] Date of Patent: Oct. 10, 2000

[54] POLYESTER RESIN AND PRODUCTION METHOD THEREOF

[75] Inventors: Hirotoshi Sonoda; Atsushi Hara; Mitsuhiro Harada, all of Ohtsu; Yoshio Araki; Shouji Kikuchi, both of Iwakuni; Takashi Hashimoto, Tsuruga; Keisuke Suzuki, Tsuruga; Hitoshi Furusaki, Tsuruga; Kazuki Yamauchi, Iwakuni; Yoshinao Matsui; Osamu Kimura, both of Ohtsu; Yoshitaka Eto, Shiga-gun, all of Japan

[73] Assignee: Toyo Boseki Kabushiki Kaisha, Osaka, Japan

[21] Appl. No.: 09/385,672

[22] Filed: Aug. 27, 1999

[30] Foreign Application Priority Data

| Aug. 27, 1998 | [JP] | Japan | ................................. | 10-240956 |
| Aug. 27, 1998 | [JP] | Japan | ................................. | 10-240960 |
| Aug. 27, 1998 | [JP] | Japan | ................................. | 10-240963 |
| Jan. 22, 1999 | [JP] | Japan | ................................. | 11-014701 |

[51] Int. Cl.$^7$ .............................. B29D 22/00; C08F 6/00
[52] U.S. Cl. ...................... 428/35.7; 528/279; 528/283; 528/298; 528/308.1; 528/481; 528/499; 528/503; 525/437; 525/444; 525/445; 210/767; 210/787; 210/263; 428/36.92
[58] Field of Search ..................... 528/279, 283, 528/298, 308.1, 481, 499, 503; 525/437, 444, 445; 210/767, 787, 263; 428/35.7, 36.92

[56] References Cited

U.S. PATENT DOCUMENTS 5,241,046  8/1993  Shiraki et al. .......................... 528/502
5,270,444  12/1993  Shiraki et al. .......................... 528/499

FOREIGN PATENT DOCUMENTS 389948  10/1990  European Pat. Off. .
867458  9/1998  European Pat. Off. .

Primary Examiner—Samuel A. Acquah
Attorney, Agent, or Firm—Leydig, Voit & Mayer, Ltd.

[57] ABSTRACT

A polyester resin comprising a polyester resin chip (A) and a polyester resin fine particle (B) which has the same composition as the (A) and which passes through a 10.5 mesh screen in a proportion of 0.1–300 ppm, wherein a cyclic trimer increases in a proportion of not more than 0.30 wt % upon melting at a temperature of 290° C. for 60 minutes; a polyester resin characterized in that a cyclic trimer increases in a proportion of not more than 0.30 wt % upon melting at a temperature of 290° C. for 60 minutes, and the contents of Na, Ca, Mg and/or Si in the polyeser resin is 0.001–5 ppm and the total of these contents is not more than 10 ppm; and production methods thereof. According to the polyester resin of the present invention, mold such as stretch blow mold, heat setting mold, vacuum forming mold and the like are less stained in sheet forming, bottle forming and the like, so that forming can be continued for a long time to easily produce a multitude of formed articles with superior transparency. As a result, hollow articles having superior transparency and heat resistance of the finish part can be obtained.

32 Claims, 1 Drawing Sheet

POLYESTER RESIN AND PRODUCTION METHOD THEREOF

TECHNICAL FIELD OF THE INVENTION

The present invention relates to a polyester resin preferably used as a material for an article, such as a stretch blow molded container used for bottles of beverages, a film, a sheet and the like, and a production method thereof. More particularly, the present invention relates to a polyester resin for bottles, which suffers less from a stain of a mold such as a stretch blow mold, a heat setting mold, a vacuum forming mold and the like, during forming and which has superior transparency and heat resistance of a finish part (a part of a bottle where a cap is applied), and to a production method thereof.

BACKGROUND OF THE INVENTION

A polyester (hereinafter sometimes abbreviated as PET resin) having a main repeat unit of ethylene terephthalate is used as a material for containers of, for example, carbonated drink, juice, mineral water and the like, due to the superior properties it has in transparency, mechanical strength, heat resistance, gas barrier property and the like, and has been dominantly used for these purposes. For this use, a polyester bottle is hot-filled with beverage sterilized at a high temperature, or the beverage is sterilized at a high temperature after filling. Typical polyester bottles suffer from shrinkage and deformation during hot filling treatment and the like. The heat resistance of polyester bottles may be improved by a proposed method comprising imparting higher crystallinity by a heat treatment of the bottle finish part, or heat-fixing the bottles after stretch blowing. These methods, nevertheless, are associated with the possibility of leakage of the content as a result of poor sealability of the cap, particularly when finish part shows insufficient crystallization or when the crystallization degree varies greatly.

For an improved heat resistance of the bottlebody, moreover, a heat treatment is applied by raising the temperature of stretch blow mold, as shown in JP-B-59-6216. When a number of bottles are formed using the same mold according to such method, however, the obtained bottles increasingly whiten with longer hours of operation. This has a consequence that the transparency is degraded to finally produce bottles without a product value. It has been elucidated that a cyclic trimer derived from a PET resin attaches to the surface of the mold and stains the mold, and this mold stain transfers to the surface of the bottles. Particularly, since a higher forming speed is employed for the production of smaller bottles in recent years, the mold stain is posing a growing problem from the aspect of productivity.

In addition, when the content requires hot filling, such as in the case of fruit juice, the finish part of a preform or molded bottle is generally heat treated for crystallization (method described in JP-A-55-79237 and JP-A-58-110221). Such method for increasing the heat resistance by heat treating the finish part and the shoulder part is subject to variation in productivity depending on the time and temperature of the crystallization treatment. Thus, the PET resin preferably has a high crystallization rate to allow treatment at a low temperature in a short time. The bottlebody is required to be transparent even after heat treatment during forming, so that the tone of the packed product will not be degraded. Therefore, the finish part and the body need to have opposite properties.

Various propositions have been made to solve these problems. For example, a method comprising addition of an inorganic nucleating agent such as kaolin and talc to polyethylene terephthalate (JP-A-56-2342, JP-A-56-21832), a method comprising addition of an organic nucleating agent such as montanic wax and the like (JP-A-57-125246, JP-A-57-207639) and the like have been proposed, but these methods accompany foreign substance and clouding, posing problems in actual application. In addition, a method comprising inserting a heat resistant resin piece into the finish part (JP-A-61-259946, JP-A-2-269638) has been proposed, but the bottle shows poor productivity and there are problems of recyclability.

The problems of staining of a mold has been conventionally dealt with by reducing cyclic trimer, which is the main component of the substance attached to the mold surface, by subjecting PET resin to solid phase polymerization in advance. This method, nevertheless, offers only an insufficient effect, as cyclic trimer is regenerated by re-melting during parison molding. In U.S. Pat. Nos. 5,219,984, 5,241,046 and 5,270,444, a method for suppressing the activity of a catalyst and the generation of cyclic trimer during parison molding is disclosed, which comprises treating a polyester resin with water at 90–110° C. However, this method requires a special apparatus and time for the treatment, making the production process complicated. While the above-mentioned method reduces stains of the mold to some extent, the effect is not sufficient and, in some cases, the effect was unnecessary.

During the water treatment, the fine particles (resin fine powder) attached to the polyester chip are suspended or precipitated in water during the treatment, which then attach to the wall of treatment tanks and pipes, thus clogging the pipes and making cleaning of the treatment tanks and pipes difficult.

The fine particles suspended or precipitated in water treatment and then attached to the wall of treatment tanks and pipes attach to the polyester chips again. This has a consequence that crystallization is promoted during forming and the transparency of the bottles becomes poor. In addition, crystallization of a finish part results in the shrinkage of the finish part outside the standard level, causing failure of capping.

When this method is industrially used, distilled water is economically disadvantageous as the water for treatment, and industrial water prepared by simplified treatment of water from river, underground water, gray water and the like is generally used. When industrial water is used for the water treatment, however, crystallization during forming occurs too early only to produce bottles having poor transparency. In addition, crystallization of finish part may result in the shrinkage of the finish part to the level outside the standard range, causing failure of capping.

According to the study of the present inventors, when the content of a metal-containing substance [e.g., sodium (Na), calcium (Ca), magnesium (Mg), silicon (Si) and the like] in the industrial water is above a certain level during water treatment, a metal-containing substance (e.g., oxide and hydroxide), which is called a scale of these metals, suspends or precipitates in the treatment water and attaches to the wall of the treatment tank and pipe. The attached substance adheres to and penetrates into the polyester resin chips, promoting crystallization during forming, and making the transparency of the bottles poor. Further problems included clogging of a pipe with the metal-containing substance, and difficult cleaning of the treatment tanks and pipes. When Na is contained, scales are not produced but Na ion penetrates into the surface layer of the chip and crystallization is accelerated about the Na ion as nucleus, causing whitening of the bottle. The content of these metal-containing substances increases after rain, varies depending on the season and sometimes rises very high. The content also varies greatly depending on the source of industrial water.

Even for a resin for bottles wherein the catalyst has not been deactivated by water treatment, water having high hardness is sometimes used when the strand is chipped, but the transparency does not decrease to a significant level. However, the low transparency due to the above-mentioned foreign substance is particularly noticeable in the bottle wherein the catalyst has been deactivated by water treatment. The catalyst reacts with water and is deactivated thereby, as a result of which the catalyst converts to particles insoluble in resin. The particles become crystal nuclei that brings about a synergistic effect by the promotion of crystallization.

SUMMARY OF THE INVENTION

The present invention provides a polyester resin that is less associated with a stain of the mold, such as stretch blow mold, heat setting mold, vacuum forming mold and the like, during forming and a production method thereof. The present invention particularly aims at provision of a polyester resin having superior transparency and the heat resistance of a finish part, and a production method thereof.

Such object can be achieved by the present invention described below.

Accordingly, the present invention provides the following.
(1) A polyester resin comprising a polyester resin chip (A) and a polyester resin fine particle (B), which has the same composition as the (A) and which passes through a 10.5 mesh screen, in a proportion of 0.1–300 ppm, wherein a cyclic trimer increases by not more than 0.30 wt % upon melting at a temperature of 290° C. for 60 minutes.
(2) A polyester resin characterized in that a cyclic trimer increases by not more than 0.30 wt % upon melting at a temperature of 290° C. for 60 minutes, the polyester resin satisfies at least one of the following formulas (1) to (4):
  (1) $0.001 \leq N \leq 5$ (ppm)
  (2) $0.001 \leq C \leq 5$ (ppm)
  (3) $0.001 \leq M \leq 5$ (ppm)
  (4) $0.001 \leq S \leq 5$ (ppm)
wherein N is a sodium content, C is a calcium content, M is a magnesium content and S is a silicon content, and the total of these contents is not more than 10 ppm.
(3) A polyester resin comprising a polyester resin chip (A) and a polyester resin fine particle (B) which has the same composition as the (A) and which passes through a 10.5 mesh screen, in a proportion of 0.1–300 ppm, which is characterized in that a cyclic trimer increases by not more than 0.30 wt % upon melting at a temperature of 290° C. for 60 minutes, the polyester resin satisfies at least one of the following formulas (1) to (4):
  (1) $0.001 \leq N \leq 5$ (ppm)
  (2) $0.001 \leq C \leq 5$ (ppm)
  (3) $0.001 \leq M \leq 5$ (ppm)
  (4) $0.001 \leq S \leq 5$ (ppm)
wherein N is a sodium content, C is a calcium content, M is a magnesium content and S is a silicon content, and the total of these contents is not more than 10 ppm.
(4) The polyester resin of (1) above, wherein the polyester resin chip (A) and the polyester resin fine particles (B) are polyester resins comprising a polyolefin resin or a polyacetal resin or a polyolefin resin and a polyacetal resin in a proportion of 0.1 ppb–1,000 ppm.
(5) The polyester resin of (3) above, wherein the polyester resin chip (A) and the polyester resin fine particles (B) are polyester resins comprising a polyolefin resin or a polyacetal resin or a polyolefin resin and a polyacetal resin in a proportion of 0.1 ppb–1,000 ppm.
(6) The polyester resin of any of (1) to (5) above, which is a linear polyester resin comprising ethylene terephthalate, which is a main repeat unit, in a proportion of not less than 85 mol %.
(7) The polyester resin of any of (1) to (5) above, which is a linear polyester resin comprising ethylene-2,6-naphthalate, which is a main repeat unit, in a proportion of not less than 85 mol %.
(8) The polyester resin of any of (1) to (5) above, having an intrinsic viscosity of 0.40–0.90 dl/g.
(9) The polyester resin of any of (1) to (5) above, which is obtained by subjecting, to a water treatment, a polyester resin obtained by mainly using aromatic dicarboxylic acid or its ester-forming derivative, and glycol or its ester-forming derivative as starting materials, and Ge compound, a Ti compound or Ge compound and a Ti compound as a catalyst.
(10) The polyester resin of any of (1) to (5) above, having a density of not less than 1.370 g/cm$^3$ and a cyclic trimer content of not more than 0.35 wt %.
(11) The polyester resin of any of (1), (3), (4) and (5) above, which is obtained by treating a polyester resin chip with treatment water at 40–120° C. in a treatment tank, the water containing a polyester resin fine particle, which passes through a 20 mesh screen but does not pass through a 100–120 μm pore size glass filter, in a proportion of 1–1,000 ppm.
(12) The polyester resin of any of (2), (3) and (5) above, which is obtained by treating a polyester resin chip with treatment water in a treatment tank, the water satisfying at least one of the following formulas (1) to (4):
  (1) $0.001 \leq N \leq 1.0$ (ppm)
  (2) $0.001 \leq C \leq 0.5$ (ppm)
  (3) $0.001 \leq M \leq 0.5$ (ppm)
  (4) $0.01 \leq S \leq 2.0$ (ppm)
wherein N is a sodium content, C is a calcium content, M is a magnesium content and S is a silicon content, wherein the total of these contents is not more than 3.0 ppm.
(13) The polyester resin of (11) above, wherein the treatment water for the water treatment contains particles having a particle size of 1–25 μm in a proportion of 1–50,000 particles/10 ml and is introduced from the outside the system.
(14) The polyester resin of (12) above, wherein the treatment water for the water treatment contains particles having a particle size of 1–25 μm in a proportion of 1–50,000 particles/10 ml and is introduced from the outside the system.
(15) A resin mixture comprising the polyester resin of (1) or (3) above, and a polyolefin resin or a polyacetal resin or a polyolefin resin and a polyacetal resin in a proportion of 0.1 ppb–1,000 ppm.
(16) The resin mixture of (15) above, wherein the polyolefin resin and polyacetal resin comprise particles having a particle size of 0.1–10 μm.
(17) A production method of a polyester resin, comprising treating a polyester resin chip with water in a treatment tank, wherein the treatment water discharged with polyester resin chips is controlled to make the proportion of a polyester resin fine particle, which passes through a 20 mesh screen but does not pass through a 100–120 μm pore size glass filter, 1–1,000 ppm.

(18) A production method of a polyester resin comprising treating a polyester resin chip with water in a treatment tank, wherein the treatment water is controlled such that the treatment water discharged from the treatment tank with polyester resin chips satisfies at least one of the following formulas (1) to (4):

(1) $0.001 \leq N \leq 10.0$ (ppm)
(2) $0.001 \leq C \leq 5.0$ (ppm)
(3) $0.001 \leq M \leq 2.0$ (ppm)
(4) $0.01 \leq S \leq 10.0$ (ppm)

wherein N is a sodium content, C is a calcium content, M is a magnesium content and S is a silicon content, and the total of these contents is not more than 20 ppm.

(19) A production method of a polyester resin comprising treating a polyester resin chip with water in a treatment tank, wherein the treatment water containing particles having a particle size of 1–25 $\mu$m in a proportion of 1–50,000 particles/10 ml is introduced from outside the system for the water treatment.

(20) A production method of a polyester resin comprising treating a polyester resin chip with water in a treatment tank, wherein the treatment water is introduced from outside the system and contains particles having a particle size of 1–25 $\mu$m in a proportion of 1–50,000 particles/10 ml and the treatment water discharged with polyester resin chips from the treatment tank contains a polyester resin fine particle, which passes through a 20 mesh screen but does not pass through a 100–120 $\mu$m pore size glass filter, in a proportion of 1–1,000 ppm, and satisfies at least one of the following formulas (1) to (4):

(1) $0.001 \leq N \leq 10.0$ (ppm)
(2) $0.001 \leq C \leq 5.0$ (ppm)
(3) $0.001 \leq M \leq 2.0$ (ppm)
(4) $0.01 \leq S \leq 10.0$ (ppm)

wherein N is a sodium content, C is a calcium content, M is a magnesium content and S is a silicon content, and the total of these contents is not more than 20 ppm.

(21) The production method of (17) above, wherein the treatment water discharged with polyester resin chips from the treatment tank is partially returned to the treatment tank.

(22) The production method of (18) above, wherein the treatment water discharged with polyester resin chips from the treatment tank is partially returned to the treatment tank.

(23) The production method of (20) above, wherein the treatment water discharged with polyester resin chips from the treatment tank is partially returned to the treatment tank.

(24) The production method of (21) or (23) above, wherein the treatment water to be returned to the treatment tank, which contains polyester resin fine particles which pass through a 20 mesh screen but do not pass through a 100–120 $\mu$m pore size glass filter, is passed through a filter selected from the group consisting of a belt filter, a bag filter and a centrifugal filter to control the polyester resin fine particle content.

(25) The production method of (22) or (23) above, wherein the treatment water discharged from the treatment tank is applied to an ion exchange treatment and returned to the treatment tank.

(26) The production method of any of (19), (20) and (23) above, wherein the water to be introduced from the outside the system is passed through a filter selected from the group consisting of a belt filter, a bag filter, a cartridge filter and a centrifugal filter to control particles in the water having a particle size of 1–25 $\mu$m to 1–50,000 particles/10 ml.

(27) The production method of any of (17) to (20) above, wherein the polyester resin to be water treated comprises ethylene terephthalate as the main repeat unit and has an intrinsic viscosity of 0.55–1.30 dl/g.

(28) The production method of any of (17) to (20) above, wherein the polyester resin to be water treated comprises ethylene-2,6-naphthalate as the main repeat unit and has an intrinsic viscosity of 0.55–1.30 dl/g.

(29) A hollow article obtained by forming the polyester resin of any of (1) to (5) above.

(30) A hollow article obtained by forming the resin mixture of (15) above.

DETAILED DESCRIPTION OF THE INVENTION

Figure 1:
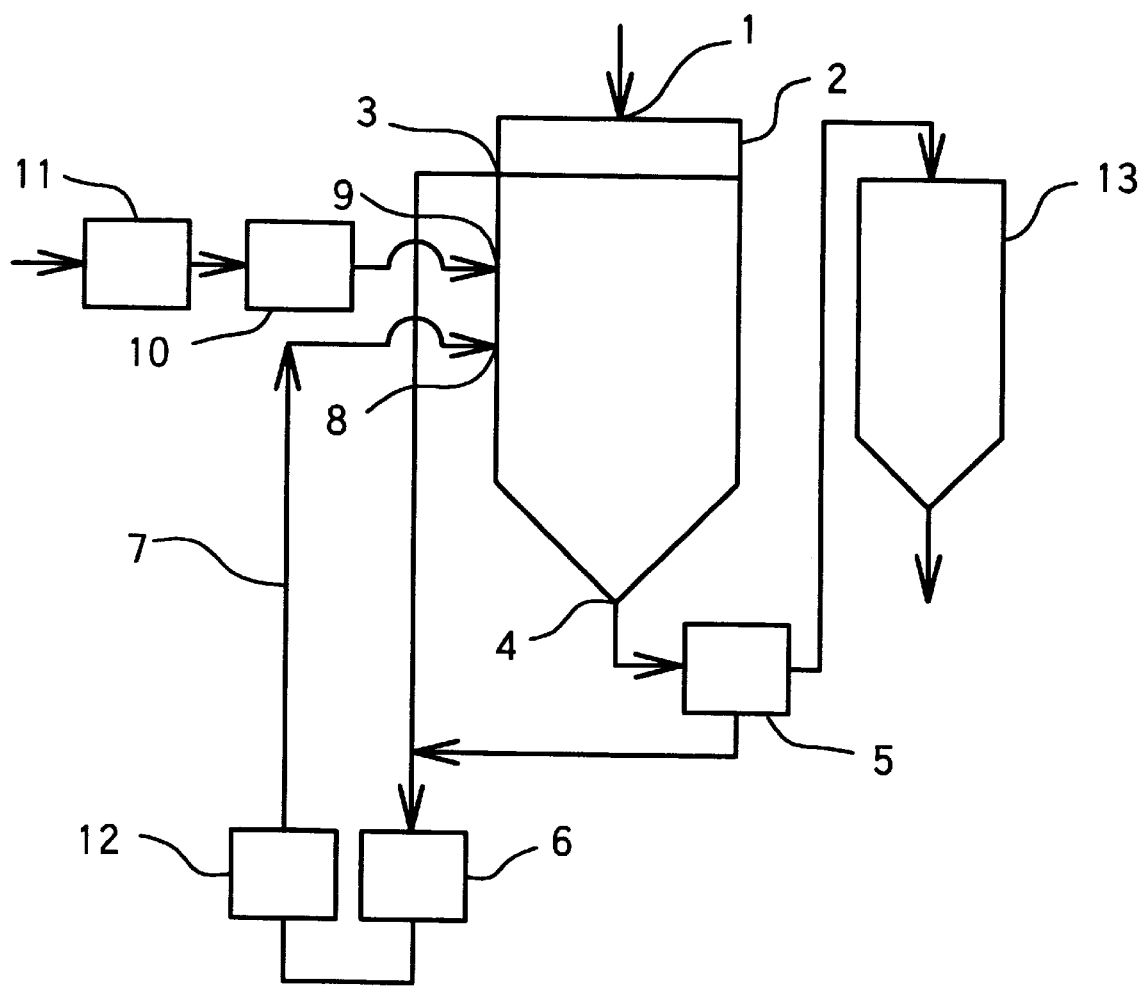
FIG. 1 shows a schematic view of the apparatus used for the production method of the polyester resin of the present invention.

The polyester resin of the present invention comprises a polyester resin chip (A) and a polyester resin fine particle (B) which has the same composition as the (A) and which passes through a 10.5 mesh screen, in a proportion of 0.1–300 ppm, wherein a cyclic trimer increases by not more than 0.30 wt % upon melting at a temperature of 290° C. for 60 minutes.

The polyester resin of the present invention comprises a polyester resin chips (A) and a polyester resin fine particle (B) which has the same composition as the (A) and which passes through a 10.5 mesh screen but does not pass through a 100–120 $\mu$m pore size glass filter, in a proportion of 0.1–300 ppm, wherein a cyclic trimer increases by not more than 0.30 wt % upon melting at a temperature of 290° C. for 60 minutes.

The polyester resin of the present invention is characterized in that a cyclic trimer increases by not more than 0.30 wt % upon melting at a temperature of 290° C. for 60 minutes, and the polyester resin satisfies at least one of the following formulas (1) to (4):

(1) $0.001 \leq N \leq 5$ (ppm)
(2) $0.001 \leq C \leq 5$ (ppm)
(3) $0.001 \leq M \leq 5$ (ppm)
(4) $0.001 \leq S \leq 5$ (ppm)

wherein N is a sodium content, C is a calcium content, M is a magnesium content and S is a silicon content, and the total of these contents is not more than 10 ppm.

Preferably, the polyester resin of the present invention comprises a polyester resin chip (A) and a polyester resin fine particle (B) which has the same composition as the (A) and which passes through a 10.5 mesh screen, in a proportion of 0.1–300 ppm, and is characterized in that a cyclic trimer increases by not more than 0.30 wt % upon melting at a temperature of 290° C. for 60 minutes, and the polyester resin satisfies at least one of the following formulas (1) to (4):

(1) $0.001 \leq N \leq 5$ (ppm)
(2) $0.001 \leq C \leq 5$ (ppm)
(3) $0.001 \leq M \leq 5$ (ppm)
(4) $0.001 \leq S \leq 5$ (ppm)

wherein N is a sodium content, C is a calcium content, M is a magnesium content and S is a silicon content, and the total of these contents is not more than 10 ppm.

Preferably, the polyester resin of the present invention comprises a polyester resin chip (A) and a polyester resin fine particle (B) which has the same composition as the (A)

and which passes through a 10.5 mesh screen but does not pass through a 100–120 μm pore size glass filter, in a proportion of 0.1–300 ppm, and is characterized in that a cyclic trimer increases by not more than 0.30 wt % upon melting at a temperature of 290° C. for 60 minutes, and the polyester resin satisfies at least one of the following formulas (1) to (4):

(1) $0.001 \leq N \leq 5$ (ppm)
(2) $0.001 \leq C \leq 5$ (ppm)
(3) $0.001 \leq M \leq 5$ (ppm)
(4) $0.001 \leq S \leq 5$ (ppm)

wherein N is a sodium content, C is a calcium content, M is a magnesium content and S is a silicon content, and the total of these contents is not more than 10 ppm.

The polyester resin and resin composition of the present invention preferably contain a polyolefin resin and/or a polyacetal resin in a proportion of 0.1 ppb–1,000 ppm together with polyester fine particles that pass through a 10.5 mesh screen.

The polyester resin and resin composition of the present invention preferably contain a polyolefin resin and/or a polyacetal resin in a proportion of 0.1 ppb–1,000 ppm together with polyester fine particles that pass through a 10.5 mesh screen but do not pass through a 100–120 μm pore size glass filter.

The polyester resin of the present invention is a crystallization polyester resin that is mainly obtained from an aromatic dicarboxylic acid component and a glycol component. More preferably, it is a polyester resin comprising the aromatic dicarboxylic acid in a proportion of not less than 85 mol %, more preferably not less than 90 mol %, of the acid component.

The polyester resin preferably has a main repeat unit of ethylene terephthalate. It is more preferably a linear polyester resin comprising the ethylene terephthalate unit in a proportion of not less than 85 mol %, particularly preferably not less than 95 mol %; namely, polyethylene terephthalate (hereinafter to be abbreviated as PET).

Preferably, it is a polyester resin having a main repeat unit of ethylene-2,6-naphthalate. It is more preferably a linear polyester resin comprising the ethylene-2,6-naphthalate unit in a proportion of not less than 85 mol %, particularly preferably not less than 90 mol %. Namely, a polyethylene naphthalate homopolymer or a copolymer comprising ethylene terephthalate (hereinafter the both are to be abbreviated as PEN).

Preferably, it is obtained by mainly using an aromatic dicarboxylic acid or an ester-forming derivative thereof and glycol or an ester-forming derivative thereof as starting materials, and a Ge compound and/or a Ti compound as a catalyst.

The aromatic dicarboxylic acid component constituting the polyester resin of the present invention is exemplified by aromatic dicarboxylic acid (e.g., terephthalic acid, 2,6-naphthalenedicarboxylic acid, diphenyl-4,4'-dicarboxylic acid, diphenoxyethanedicarboxylic acid and the like), functional derivatives thereof and the like.

The glycol component constituting the polyester resin of the present invention is exemplified by aliphatic glycol (e.g., ethylene glycol, trimethylene glycol, tetramethylene glycol and the like), alicyclic glycol (e.g., cyclohexanedimethanol and the like), and the like.

The acid component other than the aromatic dicarboxylic acid component to be copolymerized in the above-mentioned polyester resin is exemplified by oxy-acid such as p-oxybenzoic acid, oxycapric acid ant the like and functional derivative thereof, aliphatic dicarboxylic acid such as adipic acid, sebacic acid, succinic acid, glutaric acid, dimer acid and the like, and functional derivative thereof, alicyclic dicarboxylic acid such as hexahydroterephthalic acid, hexahydroisophthalic acid, cyclohexanedicarboxylic acid and the like and functional derivative thereof, and others.

The glycol component to be used in the above-mentioned polyester resin by copolymerization includes aliphatic glycol such as ethylene glycol, trimethylene glycol, tetramethylene glycol, diethylene glycol, neopentyl glycol and the like, aromatic glycol such as bisphenol A, alkylene oxide adduct of bisphenol A and the like, polyalkylene glycol such as, polyethylene glycol, polybutylene glycol and the like.

In addition, a multifunctional compound such as trimellitic acid, trimesic acid, pyromellitic acid, tricarballylic acid, glycerol, pentaerythritol, trimethylolpropane and the like may be copolymerized, or a monofunctional compound such as benzoic acid, naphthoic acid and the like may be copolymerized, as long as the polyester resin is substantially linear.

The amount of diethylene glycol copolymerized with the polyester resin of the present invention is preferably 1.0–5.0 mol %, more preferably 1.3–4.5 mol %, and most preferably 1.5–4.0 mol %, of the glycol component constituting the polyester resin. When the diethylene glycol content exceeds 5.0 mol %, heat stability becomes poor and the molecular weight reduces to a greater degree during molding. In addition, acetaldehyde content and formaldehyde content undesirably increases too much. When the diethylene glycol content is less than 1.0 mol %, the obtained molded product has poor transparency.

In the polyester resin of the present invention, the cyclic trimer is preferably not more than 0.50 wt %, more preferably not more than 0.35 wt %, most preferably not more than 0.33 wt %, particularly preferably not more than 0.30 wt %. When a heat resistant blow molded article is to be prepared from the polyester resin of the present invention, a heat treatment is carried out in a heating mold. When the cyclic trimer content is higher than 0.50 wt %, the amount of oligomer attached to the surface of the heated mold suddenly increases and the obtained hollow article has an extremely poor transparency.

The polyester resin of the present invention preferably contains small amounts of Na, Ca, Mg and Si, wherein the Na content (N), Ca content (C), Mg content (M), and Si content (S) are respectively 0.001–5 ppm, preferably 0.005–1 ppm, more preferably 0.01–0.5 ppm and most preferably 0.01–0.3 ppm.

The total content of N, C, M and S is not more than 10 ppm, preferably not more than 5 ppm, more preferably not more than 1 ppm.

When all of N, C, M and S values are less than 0.001 ppm, crystallization rate becomes extremely slow, making crystallization of the finish part of a stretch blow molded container insufficient, as a result of which capping failure occurs as the amount of shrinkage of the finish part is not within the predetermined range, and a sheet product obtained has a poor dimensional stability of the container after forming.

When each of the N, C, M and S values exceeds 5 ppm, crystallization rate becomes faster and crystallization of the finish part of a stretch blow molded container becomes too great. As a result, the amount of shrinkage of the finish part does not fall within the predetermined range, and capping of the finish part becomes defective. Consequently, the content may leak or a preform for blow molding whitens, which makes normal stretching unattainable. The values of N, C, M and S are preferably not more than 5 ppm, respectively.

The polyester resin of the present invention, wherein the Na, Ca, Mg and/or Si contents fall within the range of 0.001–5 ppm, can be produced by treating a polyester resin obtained by polymerization of each of the above-mentioned components with treatment water having the contents of sodium (N, ppm), calcium (C, ppm), magnesium (M, ppm) and silicon (S, ppm) satisfying at least one of the following formulas (1) to (4), wherein the total of these contents is not more than 20 ppm:

(1) $0.001 \leq N \leq 10.0$ (ppm)

(2) $0.001 \leq C \leq 5.0$ (ppm)

(3) $0.001 \leq M \leq 2.0$ (ppm)

(4) $0.01 \leq S \leq 10.0$ (ppm).

Preferably the treatment water satisfies at least one of the following formulas (1) to (4) and the total of the contents is not more than 3.0 ppm:

(1) $0.001 \leq N \leq 1.0$ (ppm)

(2) $0.001 \leq C \leq 0.5$ (ppm)

(3) $0.001 \leq M \leq 0.5$ (ppm)

(4) $0.01 \leq S \leq 2.0$ (ppm).

In the polyester resin of the present invention, an acetaldehyde content is preferably not more than 10 ppm, more preferably not more than 8 ppm, most preferably not more than 6 ppm and particularly preferably not more than 4 ppm. The formaldehyde content is preferably not more than 8 ppm, more preferably not more than 6 ppm, most preferably not more than 5 ppm, and particularly preferably not more than 4 ppm. When the acetaldehyde content is not less than 10 ppm and/or formaldehyde content is not less than 8 ppm, a container and the like formed from this polyester resin have poor flavor and degraded smell.

When the polyester resin of the present invention is melted at 290° C. for 60 minutes, a cyclic trimer increases by not more than 0.30 wt %, preferably not more than 0.20 wt %, and more preferably not more than 0.10 wt %. When a polyester resin which shows a cyclic trimer increase of more than 0.30 wt % is used for stretch blow molding, the cyclic trimer increases in amount during melting the resin; oligomer attachment to the surface of the heated mold rapidly increases; and the obtained blow molded product and the like have significantly poor transparency. Since it attaches to the inner surface of the mold, a gas exhaust outlet of the mold and exhaust pipes, frequent cleaning of the mold is needed to obtain a transparent stretch blow molded container.

The polyester resin of the present invention preferably has a Tcl of a molded product formed upon heat-melting at 290° C. of 150–250° C., preferably 155–250° C., and a haze of not more than 15%. When Tcl is lower than 150° C., a molded product obtained therefrom has an extremely low transparency. When Tcl is higher than 250° C., a bottle obtained has a low crystallinity of the finish part and low heat resistance. As a consequence, when the contener is filled, the content may leak after capping. A polyester resin that makes the haze of a molded product not less than 15% also makes the transparency of the molded product disadvantageously poor.

When the main repeat unit is a polyester resin comprising ethylene terephthalate, namely, polyethylene terephthalate (PET), a molded product obtained by heat melting at 290° C. has Tcl of 150–175° C., preferably 155–175° C., and a haze of not more than 15%.

When the main repeat unit is a polyester resin comprising ethylene-2,6-naphthalate, namely, a polyethylene naphthalate homopolymer or a copolymer comprising ethylene terephthalate (PEN), a molded product obtained by heat melting at 290° C. has Tcl of 180–250° C. and a haze of not more than 15%.

The polyester resin chiop of the polyester resin of the present invention preferably has an intrinsic viscosity of 0.40–1.30 dl/g, more preferably 0.40–0.90 dl/g, and a density of 1.335–1.415 g/cm$^3$, more preferably 1.370–1.415 g/cm$^3$. When the intrinsic viscosity is lower than 0.40 dl/g, the obtained molded product has degraded transparency, heat resistance and mechanical property. When the intrinsic viscosity is higher than 1.30 dl/g, the temperature of the resin during melting by forming becomes high to cause thermal decomposition. As a result, the content of free low molecular weight compounds that affect flavor retention increases and the molded product turns yellow.

When the main repeat unit is a polyester resin comprising ethylene terephthalate, namely, polyethylene terephthalate (PET), the lower limit of intrinsic viscosity is 0.50 dl/g, preferably 0.55 dl/g, more preferably 0.58 dl/g, particularly preferably 0.60 dl/g, most preferably 0.65 dl/g, and the upper limit thereof is preferably 1.30 dl/g, more preferably 1.20 dl/g, most preferably 0.90 dl/g, particularly preferably 0.87 dl/g. The density has a lower limit of preferably 1.370 g/cm$^3$, more preferably 1.380 g/cm$^3$, most preferably 1.390 g/cm$^3$ and the upper limit is preferably 1.415 g/cm$^3$, more preferably 1.413 g/cm$^3$, most preferably 1.410 g/cm$^3$.

When the main repeat unit is apolyester resin comprising ethylene-2,6-naphthalate, namely, a polyethylene naphthalate homopolymer or a copolymer comprising ethylene terephthalate (PEN), the intrinsic viscosity has a lower limit of preferably 0.40 dl/g, more preferably 0.43 dl/g, most preferably 0.45 dl/g, and the upper limit is preferably 1.20 dl/g, more preferably 1.10 dl/g, most preferably 1.00 dl/g, particularly preferably 0.90 dl/g. The density has a lower limit of preferably 1.345 g/cm$^3$, more preferably 1.350 g/cm$^3$, and the upper limit is preferably 1.370 g/cm$^3$, more preferably 1.365 g/cm$^3$.

When the product is mainly obtained from an aromatic dicarboxylic acid or an ester-forming derivative thereof and glycol or an ester-forming derivative thereof as starting materials, and a Ge compound and/or a Ti compound as a catalyst, the intrinsic viscosity has a lower limit of preferably 0.68 dl/g, more preferably 0.69 dl/g, most preferably 0.70 dl/g and the upper limit of preferably 0.90 dl/g, more preferably 0.88 dl/g, most preferably 0.86 dl/g. The density has a lower limit of preferably 1.370 g/cm$^3$, more preferably 1.380 g/cm$^3$, most preferably 1.390 g/cm$^3$, and the upper limit is preferably 1.415 g/cm$^3$, more preferably 1.413 g/cm$^3$, most preferably 1.410 g/cm$^3$.

The polyester resin chip may have any shape in the polyester resin of the present invention, such as a cylinder, rectangle, flat board and the like, and the length, width and height of generally 1.5–4 mm, preferably 1.8–4 mm, more preferably 2–4 mm, respectively. In the case of a cylinder, it is practically 1.5–4 mm, preferably 2–4 mm, in length and about 1.5–4 mm, preferably 2–4 mm, in diameter. The weight of the chip is practically in the range of 15–30 mg/chip.

The polyester resin of the present invention comprises a polyester resin fine particle (B), which passes through a 10.5 mesh screen, in a proportion of 0.1–300 ppm, more preferably 0.2–250 ppm. The polyester resin of the present invention comprises polyester resin fine particle (B), which passes through a 10.5 mesh screen but does not pass through a 100–120 μm pore size glass filter, in a proportion of 0.1–300 ppm, more preferably 0.2–250 ppm. When the content is less than 0.1 ppm, crystallization rate becomes very slow, making crystallization of the finish part of a stretch blow molded container insufficient, as a result of which normal capping becomes defective due to no adjustment of the shrinkage of the finish part within the predetermined range. In addition, the stretching and heat setting mold used for forming a heat resistant stretch blow molded container is stained heavily and needs to be cleaned frequently to produce a transparent, stretch blow molded container. In any of the above-mentioned polyester resins, when it exceeds 300 ppm, crystallization rate becomes faster, making crystallization of the finish part of a stretch blow molded container in excess, as a result of which capping failure occurs since the amount of shrinkage of the finish part does not fall within the predetermined range. Consequently, the content may leak or a preform for hollow molding whitens, which makes normal drawing unattainable.

In the present specification, by a polyester resin fine particle is meant particles, powder and the like considerably smaller in size than a chip having a predetermined size set for granulation. Such particles, powder and the like are produced during the production of a polyester resin, such as a step to give chips from a melt polymerized polymer, a solid phase polymerization step, a step to transport melt polymerization polymer chips and solid phase polymerization polymer chips and the like. The particles are measured by a method (Measurement 1 to be mentioned later) wherein a standard 10.5 mesh screen according to JIS-Z-8801 is used to screen 1000 kg of polyester resin, thereby to divide those capable of passing through a 10.5 mesh screen, or a method (Measurement 2 to be mentioned later) wherein a polyester resin (ca. 0.5 kg/one time, total 10–30 kg) is placed on a screen (diameter 30 cm, according to JIS-Z8801) having a 10.5 mesh metal net placed thereon, shaken for 1 minute at a total amplitude of about 7 cm, 60 reciprocation/min while showering a 0.1% aqueous cationic surfactant (alkyl trimethyl ammonium chloride) solution thereon at a flow amount of 2 L/min, and then the polyester resin is passed through a 1 Gl glass filter (fine pore size 100–120 $\mu$m) manufactured by IWAKI GLASS Co., Ltd. together with the aqueous surfactant solution, thereby to divide particles capable of passing through a 10.5 mesh screen but incapable of passing through a 100–120 $\mu$m pore size glass filter. The particles in the treatment water, which are to be measured, pass through a 20 mesh screen according to JIS-Z-8801 but do not pass through a 100–120 $\mu$m pore size glass filter. The copolymerizable component of the fine particle and the content of this copolymerizable component are preferably the same as those of polyester resin chip. That is, the chip and fine particle preferably have the same composition.

The intrinsic value of the polyester resin fine particle measured by the above method is preferably the same as the intrinsic viscosity of the polyester resin chip, or higher by 0.03 than the intrinsic viscosity of the polyester resin chip.

The content of the fine particles in the polyester resin, namely, those measured as being capable of passing through a 10.5 mesh screen or those measured as being capable of passing through a 10.5 mesh screen but incapable of passing through a 100–120 $\mu$m pore size glass filter, may be adjusted by mixing, at an appropriate ratio, a polyester resin chip without screening process but having a high fine particle content, and a polyester resin chip that underwent screening process and fine particle removal process by the use of an air stream and has an extremely low fine particle content. Alternatively, it can be controlled by varying the mesh of screen for screening process and/or by varying the capability of removing fine particles with an air stream. In the fine particle removal step, for example, adjustment of the fine particle content is possible by appropriately varying the amount of the air stream. The same effect can be achieved by changing the amount of the polyester resin to be treated per unit time.

To set the increase of a cyclic trimer, when the polyester resin of the present invention is melted at 290° C. for 60 minutes, to not more than 0.30 wt %, the polycondensation catalyst in the polyester resin needs to be deactivated by water treatment and the like. Thus, the amount of the fine particle is preferably controlled in the step for deactivation of the catalyst.

The polyester resin of the present invention comprises a polyester resin chip (A) and a polyester resin fine particle (B) which has the same composition as the (A) and which passes through a 10.5 mesh screen, in a proportion of 0.1–300 ppm, wherein a cyclic trimer increases in a proportion of not more than 0.30 wt % upon melting at 290° C. for 60 minutes, or the polyester resin of the present invention comprises a polyester resin chip (A) and a polyester resin fine particle (B) which has the same composition as the (A) and which passes through a 10.5 mesh screen but does not pass through a 100–120 $\mu$m pore size glass filter, in a proportion of 0.1–300 ppm, wherein a cyclic trimer increases in a proportion of not more than 0.30 wt % upon melting at 290° C. for 60 minutes. The polyester resin of the present invention can be preferably produced by subjecting the polyester resin obtained by polymerization of each of the above-mentioned components to a water treatment using treatment water containing a polyester resin fine particle that passes through a 20 mesh screen but does not pass through a 100–120 $\mu$m pore size glass filter, in a proportion of 1–1,000 ppm.

Preferably, the treatment water has a temperature of 40–120° C. and a polyester resin fine particle content of 1–1,000 ppm.

The polyester resin and resin mixture of the present invention contains a polyolefin resin and/or a polyacetal resin in a proportion of 0.1 ppb–1,000 ppm together with polyester resin fine particles, namely, those measured as being capable of passing through a 10.5 mesh screen or those measured as being capable of passing through a 10.5 mesh screen but incapable of passing through a 100–120 $\mu$m pore size glass filter. By concurrently containing a polyester resin fine particle and a polyolefin resin and/or a polyacetal resin in the polyester resin within the above-mentioned content range, the molded article with a superior transparency and dimensional stability can be obtained and stains of the mold can be reduced. In addition, by adjusting the content of the polyolefin resin and/or a polyacetal resin, the crystallization rate of the polyester can be controlled to a suitable range. The polyolefin resin and/or a polyacetal resin can promote crystallization of polyester, and can be used to particularly promote crystallization of the finish part of a heat resistant PET bottle. However, stains of the mold cannot be reduced when used without fine particles.

The polyolefin resin and/or a polyacetal resin may be contained in the polyester resin chip and polyester resin fine particle, which constitute the polyester resin. Alternatively, it may be mixed in the form of a particle and the like with a polyester resin comprising polyester resin chip and polyester resin fine particle.

As used herein, by the polyolefin resin and/or a polyacetal resin being contained in the polyester resin as a constituent component is meant that the polyolefin resin and/or the polyacetal resin are/is the constituent component(s) of the polyester resin, in which case they are not the constituent components of a mixture of the polyester resin, the polyolefin resin and/or the polyacetal resin. In the latter case, it is a mixture of polyester resin and a polyolefin resin and/or a polyacetal resin, wherein the polyester resin exists in the form of a polyester resin chip and a polyester resin fine particle, and the polyolefin resin and/or the polyacetal resin exist(s) in the form of a particle and the like.

When the polyester resin contains a polyolefin resin and/or a polyacetal resin as a mixture of polyester resin and polyolefin and/or a polyacetal resin, the polyolefin resin and/or a polyacetal resin is preferably in the form of a particle. The particle size thereof is preferably 0.1–10 μm, particularly preferably 0.3–8 μm.

Examples of the above-mentioned polyolefin resin include polyethylene resin, polypropylene resin, polyethylene-polypropylene copolymer resin, polymethylpentene resin, ionomer resin and the like. The polyethylene resin is exemplified by high-density polyethylene, low-density polyethylene, linear low-density polyethylene, middle high density polyethylene, known polyethylene random copolymer, polyethylene block copolymer and the like. The copolymer component of these polyethylene copolymer is exemplified by α-olefin such as propylene, 1-hexene, 4-methyl-1-pentene, 1-octene, 1-decene and the like.

Examples of the polypropylene resin include polypropylene homopolymer, known polyethylene random copolymer, polyethylene block copolymer and the like. The copolymer component of the polyethylene copolymer includes, for example, 60-olefin such as ethylene, 1-hexene, 4-methyl-1-pentene, 1-octene, 1-decene and the like.

Examples of the above-mentioned polyacetal resin include polyacetal homopolymer and polyacetal copolymer.

As the polyacetal homopolymer, one having a density as measured ASTM-D792 of 1.40–1.42 g/cm$^3$ and a melt index (MI) as measured according to ASTMD-1238 at 190° C., load 2160 g of 0.5–50 g/10 min is preferable.

As the polyacetal copolymer, one having a density measured according to ASTM-D792 of 1.38–1.43 g/cm$^3$ and a melt index (MI) measured according to ASTMD-1238 at 190° C., load 2160 g of 0.4–50 g/10 min is preferable. The copolymerizable component of these copolymerization components comprises ethylene oxide and cyclic ether as copolymerized components.

The content of the polyolefin resin and/or polyacetal resin in the polyester resin is 0.1 ppb–1,000 ppm, wherein the lower limit is preferably 0.5 ppb, more preferably 1.0 ppb, and the upper limit is preferably 500 ppm, more preferably 100 ppm, most preferably 10 ppm.

When the content is 0.1 ppb–1,000 ppm, crystallization rate becomes moderate and crystallization of the finish part of a hollow container becomes sufficient. As a result, even if the cycle time is shortened, a stretching and heat setting mold for forming a heat resistant stretch blow molded container suffers less from staining. When it exceeds 1,000 ppm, crystallization rate becomes high to cause excess crystallization of the finish part of the hollow container. As a result, the finish part shrinks to the level which is outside the standard range to cause capping failure, which in turn leads to leakage of the content and whitening of the preform for stretch blow molded containers. Consequently, normal drawing becomes unattainable.

When a polyolefin resin and/or a polyacetal resin are/is added to the polyester resin as a component constituting the polyester resin, the time and method of addition are not particularly limited and they can be added at an optional stage before preparing the polyester resin into chips. For example, a method comprising addition at an optional time point before completion of melt polycondensation, a method comprising blending a high concentration master batch, a method comprising mixing with polyester in a mixer such as a tumbler blender and melt kneading using an extruder and the like are exemplified.

When the polyester resin and polyolefin resin and/or a polyacetal resin are mixed, the time and method of mixing are not particularly limited and they can be mixed at an optional time point before melt forming. For example, a method comprising mixing at an optional time point between completion of deactivation of polycondensation catalyst and before melt forming, a method comprising bringing a polyester resin into contact with facility member made from a polyolefin resin and/or a polyacetal resin under flowable state and the like are exemplified.

When the polyolefin resin and/or polyacetal resin are/is dispersed in the polyester resin to the mean dispersion particle size of not more than 10 μm, the molded product has an improved transparency and less varying heat resistance. The polyolefin resin and/or polyacetal resin can be dispersed in the polyester resin to the mean dispersion particle size of not more than 10 μm by, for example, the following method. That is, a method wherein a polyolefin resin and/or a polyacetal resin are/is added before melt polycondensation, and the mixture is subjected to polycondensation to a predetermined intrinsic viscosity and filtered through a 10 μm sintered metallic filter, a method wherein a dry polyester resin and a polyolefin resin and/or a polyacetal resin are knead extruded from a double screw extruder to give a high concentration master batch, wherein a mean dispersion particle size of the polyolefin resin and/or polyacetal resin in the kneaded composition is not more than 10 μm, and the batch is added during melt polycondensation for polycondensation, a method wherein a polyester resin is blended with the above-mentioned master batch before forming the polyester resin, and the like are exemplified.

The polyester resin of the present invention may contain saturated fatty acid monoamide, unsaturated fatty acid monoamide, saturated fatty acid bisamide, unsaturated fatty acid bisamide and the like.

Examples of the above-mentioned saturated fatty acid monoamide include lauramide, palmitamide, stearamide, behenamide and the like. Examples of the unsaturated fatty acid monoamide include oleamide, erucamide, ricinolamide and the like. Examples of the saturated fatty acid bisamide includes N,N'-methylenebisstearamide, N,N'-ethylenebiscapramide, N,N'-ethylene bislauramide, N,N'-ethylenebisstearmide, N,N'-ethylenebisbehenamide, N,N'-hexamethylenebisstearamide, N,N'-hexamethylenebisbehenamide and the like. Examples of the unsaturated fatty acid bisamide include N,N'-ethylenebisoleamide, N,N'-hexamethylenebisoleamide and the like. Preferable amide compound is saturated fatty acid bisamide, unsaturated fatty acid bisamide and the like. Such amide compound is contained in the proportion of 10 ppb–1×10$^5$ ppm.

The metal salt compound of aliphatic monocarboxylic acid having 8 to 33 carbon atoms, such as lithium salt, sodium salt, potassium salt, magnesium salt, calcium salt, cobalt salt and the like of saturated and unsaturated fatty acid (e.g., naphthenic acid, caprylic acid, capric acid, lauric acid, myristic acid, palmitic acid, stearic acid, behenic acid, montanic acid, melissic acid, oleic acid, linoleic acid and the like) can be concurrently used. These compounds are contained in a proportion of 10 ppb–300 ppm.

The polyester resin of the present invention may contain various additives as necessary, such as known ultraviolet absorber, lubricant, die lubricant, nucleating agent, stabilizer, antistatic agent, pigment and the like.

The polyester resin of the present invention can be produced by polymerizing each of the above-mentioned polyester resin components to give chips, and preferably controlling the amount of fine particle in polyester resin and/or metal content when deactivating the polycondensation catalyst contained in the polyester resin by water treatment.

The above-mentioned polyester resin components can be polymerized by a method conventionally known. For example, PET can be produced by a direct esterification method, wherein terephthalic acid, ethylene glycol and other copolymerizable components as necessary are reacted directly, water is distilled away and the residue is esterified, followed by polycondensation under reduced pressure, or an ester exchange method wherein dimethyl terephthalate, ethylene glycol and other copolymerizable components as necessary are reacted, methanol is distilled away, and after ester exchange, the residue is subjected to polycondensation under reduced pressure. In addition, solid phase polymerization is applied to increase intrinsic viscosity and to lower acetaldehyde content.

The above-mentioned melt polycondensation may be conducted in a batch reaction apparatus or continuous reaction apparatus. In both methods, melt polycondensation may be conducted in a single step of multi-steps. The solid phase polymerization may be conducted in a batch reaction apparatus or continuous reaction apparatus, like melt polycondensation. The melt polycondensation and solid phase polymerization may be conducted in sequence or independently.

When the direct esterification method is employed, a Ge, Sb or Ti compound is used as a polycondensation catalyst, particularly preferred Ge compound and/or Ti compound.

Examples of the Ge compound include amorphous germanium dioxide, crystalline germanium dioxide powder or slurry of ethylene glycol, a solution of crystalline germanium dioxide dissolved in water by heating or a solution obtained by adding ethylene glycol to the above-mentioned solution and heating same and the like. The polyester resin to be particularly used in the present invention is preferably obtained by the use of a solution of germanium dioxide dissolved in water with heating, colloidal solution, or these solutions added with ethylene glycol and heated, a solution of germanium dioxide in ethylene glycol and the like. These polycondensation catalysts can be added during the esterification step. When a Ge compound is used, the amount thereof is, in the Ge residue in the polyester resin, 5–150 ppm, preferably 20–150 ppm, more preferably 23–100 ppm, most preferably 25–70 ppm.

The Ti compound is exemplified by tetraalkyl titanate such as tetraethyl titanate, tetraisopropyl titanate, tetra-n-propyl titanate, tetra-n-butyl titanate and the like and partially hydrolyzed compound thereof, titanyl oxalate compound such as titanyl oxalate, titanyl ammonium oxalate, titanyl sodium oxalate, titanyl potassium oxalate, titanyl calcium oxalate, titanyl strontium oxalate and the like, titanium trimellitate, titanium sulfate, titanium chloride and the like. The titanium compound is added in a proportion as the Ti residue in the produced polymer of 0.1–10 ppm.

As the stabilizer, the use of phosphoric acid, polyphosphoric acid, phosphoric acid esters such as trimethylphosphate and the like, and the like is preferable. These stabilizers can be added to a slurry preparation tank containing terephthalic acid and ethylene glycol or during esterification step. The P compound is added to the proportion as the P residue in the produced polymer of 5–100 ppm.

The content of DEG copolymerized in the polyester resin is controlled by adding a basic compound, such as tertiary amine (e.g., triethyleamine, tri-n-butylamine and the like), quaternary ammonium salt (e.g., tetraethylammonium hydroxide and the like), and the like during esterification step.

Then, the polyester resin obtained by the above-mentioned method and the like is prepared into chips and the polycondensation catalyst in the polyester resin is deactivated.

The polycondensation catalyst in the polyester resin is preferably deactivated by a water treatment method wherein polyester resin chip is subjected to contact treatment with water, water vapor or gas containing water vapor.

The water treatment includes a method wherein chips are immersed in water, a method wherein water is showered on the chips and the like. In any case, the treatment time is from 5 minutes to 2 days, preferably from 10 minutes to 1 day, more preferably from 30 minutes to 10 hours. The water for the water treatment has a temperature of 20–80° C., wherein the lower limit is preferably 40° C., more preferably 50° C., and the upper limit is preferably 150° C., more preferably 120° C. In the obtained polyester resin, the increase in a cyclic trimer is set to not more than 0.30 wt % upon melting at 290° C. for 60 minutes by appropriately setting the above-mentioned temperature and time. For example, the temperature is set to 70–110° C. and the time is set to 3–10 hours.

The water treatment may be performed by a continuous method or a batch method, with preference given to a continuous method.

When polyester resin chips are continuously subjected to the water treatment, polyester resin chips are continuously or intermittently cast from above into a tower treatment tank and water is continuously supplied in parallel current flows or countercurrent flows.

The preferable water treatment of polyester resin by continuous method is explained in the following by referring to FIG. 1.

In FIG. 1, polyester resin chips are continuously or intermittently (sometimes generally referred to as successively) cast from a starting material chip supply port (1) at the upper part of a tower treatment tank (2) into a treatment tank (2), along with which the treatment water is introduced from an inlet (9) to fill the treatment tank (2). The introduced treatment water can be continuously or intermittently circulated by setting an overflow discharge opening (3), a pipe (7), a treatment water return inlet (8) and the like on the treatment tank (2). Partial polyester resin chips are continuously or intermittently extracted from the discharge opening (4) at the lower part of the treatment tank (2) along with the treatment water, and fresh treatment water is supplied from an inlet (9) to permit continuous water treatment of the polyester resin chips. The polyester resin chips extracted from a treatment tank (2) through a discharge opening (4) together with the treatment water are separated from the treatment water in a dewatering apparatus (5), and a part of the separated treatment water is returned to the treatment tank (2) for recycled use. The chips separated in the apparatus (5) are dried in a drier (13) and the like to give a polyester resin wherein the polycondensation catalyst has been deactivated.

Preferably, the treatment water introduced from the inlet (9) has been treated by a metal removal apparatus (10) and/or a particles removal apparatus (11) to control metal (inclusive of a metal-containing substance) and/or particles content in the treatment water.

Preferably, the treatment water discharged from an overflow discharge opening (3) and a discharge opening (4), which is returned to treatment tank (2), is treated in a fine particle removal apparatus (6) to control the fine particle content of the treatment water. Moreover, the treatment water to be returned to the treatment tank (2) is treated in an adsorption tower (12) as necessary to control its aldehyde content.

Naturally occurring water contains naturally derived inorganic particles such as clay minerals (e.g., silicate, aluminosilicate and the like) and organic particles such as fungi, bacteria and the like. They attach to the polyester resin chip, penetrate and form crystal nuclei, so that the transparency of the stretch blow molded container made from such polyester resin becomes strikingly poor.

The treatment water to water treat polyester resin chip preferably contains the above-mentioned particles, particularly particles having a particle size of 1–25 μm, in a concentration of 1–50,000 particles/10 ml, preferably 10–50,000 particles/10 ml.

While the present invention does not particularly limit the particles in the treatment water which have a particle size over 25 μm, they are preferably contained in a proportion of not more than 2,000 particles/10 ml, more preferably not more than 500 particles/10 ml, most preferably 100 particles/10 ml, particularly preferably not more than 10 particles/10 ml.

While the present invention does not particularly limit the particles in the treatment water which have a particle size of less than 1 μm, they are preferably less to obtain a transparent resin or a resin having a suitable crystallization rate. The number of particles having a particle size of less than 1 μm is preferably not more than 100,000 particles/10 ml, more preferably not more than 50,000 particles/10 ml, most preferably not more than 20,000 particles/10 ml, particularly preferably not more than 10,000 particles/10 ml. The particles having a particle size of not more than 1 μm are removed from water or controlled therein by microfiltration, ultrafiltration and the like using a membrane such as a ceramic membrane, an organic membrane and the like.

A method for controlling the number of particles in the treatment water having a particular size of 1–25 μm to 1–50,000 particles/10 ml is exemplarily shown in the following, to which the present invention is not limited.

A method for making the number of particles in water to 1–50,000 particles/10 ml includes setting an apparatus for removing the particles at least at one position from the supply of natural water such as industrial water and the like to treatment tank. It is preferable that an apparatus for removing particles be set at some point form an inlet of water in nature, to the above-mentioned treatment tank, to the pipe for returning the water discharged from the treatment tank again to the treatment tank, and to a treatment apparatus inclusive of a fine particle removal apparatus and the like necessary for water treatment, and the number of the particles having a particle size of 1–25 μm which are in the water to be supplied to the treatment apparatus to 1–50,000 particles/10 ml. The apparatus to remove particles is exemplified by a filter filtration apparatus, membrane filtration apparatus, precipitation tank, centrifugation device, froth flotation treatment machine and the like. In the case of a filter filtration apparatus, a filtration apparatuses of a belt filter method, a bag filter method, a cartridge filter method, a centrifugal filter method and the like. Of these, a belt filter type filtration apparatus is suitable for continuous operation. The filter to be used for the belt filter type filtration apparatus may be paper, metal, cloth and the like. For efficient removal of particles and smooth flow of treatment water, a filter with a 5–100 μm, preferably 10–70 μm, more preferably 15–40 μm, mesh is preferably used.

In the above-mentioned water treatment method, the treatment water to be discharged from the treatment tank contains fine particles already attached to the polyester resin chip at the time when the chips are added into the treatment tank, and fine particles of polyester resin that are produced by friction between polyester resin chips contained in the treatment water or with the treatment tank during water treatment. Thus, when the treatment water once discharged from the treatment tank is returned to the treatment tank and used again, the amount of fine particles contained in the treatment water in the treatment tank gradually increases. This has a consequence that the fine particles contained in the treatment water attach to the walls of the treatment tank and pipes, thereby clogging the pipes. In addition, fine particles contained in the treatment water again attach to the polyester resin chips, after which polyester resin chips and fine particles attach to each other due to static electricity in a later step for removing water by drying. Removal of particles having a particle size not more than 10 μm after drying does not result in removal of fine particles to a satisfactory degree. This in turn results in the acceleration of crystallization of polyester resin, and poor transparency of the bottles produced therefrom or excess crystallization of the finish part that may cause capping failure due to too great a shrinkage of the finish part. To avoid these problems, the amount of the fine particles are preferably controlled in the water treatment step.

The concentration of the fine particles, that pass through a 20 mesh screen but do not pass through a 100–120 μm pore size glass filter, in the treatment water to be discharged together with polyester resin chips in the water treatment is adjusted to 1–1,000 ppm, preferably 5–500 ppm, more preferably 10–300 ppm to make the content of the fine particles, namely, those measured as being capable of passing through a 10.5 mesh screen or those measured as being capable of passing through a 10.5 mesh screen but incapable of passing through a 100–120 μm pore size glass filter, of the polyester resin in the present invention fall within the above-mentioned range. In this case, at least part of the treatment water is preferably the recycled water from treatment tank, which was once discharged from the treatment tank. The use of recycled water enables control of the fine particles in the treatment water, and further, the control of fine particles in the polyester resin.

A part of the water discharged from the treatment tank is used in combination with the water to be newly supplied, wherein the proportion of them is reflected to the concentration of the fine particles in the treatment water. The water to be recycled is subjected to a fine particle removal treatment on the way back to the treatment tank, which is critical to the control of fine particles in the treatment water.

In the present specification, by the treatment water to be discharged together with the polyester resin chips is meant the water to be discharged with the polyester resin from the polyester resin discharge opening of the treatment tank for the successive method, and the water to be discharged from the discharge opening together with the polyester resin, or, for the batch method, the water attached to the polyester resin to the last (i.e., water at the time of completion of the treatment) when the polyester resin is taken out from the water or when the treatment water alone is discharged earlier.

A method of controlling the fine particles in the treatment water in the treatment tank is exemplarily shown in the following, to which the present invention is not limited.

It is preferable that an apparatus for removing particles be set at least at one point up to when the treatment water discharged from the treatment tank is again returned to the treatment tank to control the amount of fine particles in the treatment water in the treatment tank. The apparatus to remove fine particles is exemplified by a filter filtration apparatus, membrane filtration apparatus, precipitation tank, centrifugation device, froth flotation treatment machine and the like. In the case of a filter filtration apparatus, for example, a filtration apparatuses of a belt filter method, a bag filter method, a cartridge filter method, a centrifugal filter method and the like are exemplified. Of these, a filtration apparatus of a belt filter type filtration apparatus, centrifugal filter type or bag filter is suitable for continuous operation. The filter to be used for the belt filter type filtration apparatus may be paper, metal, cloth and the like. For efficient removal of fine particles and smooth flow of treatment water, a filter with a 5–100 μm, preferably 10–70 μm, more preferably 15–40 μm, mesh is preferably used.

When the fine particles of polyester resin is less than 0.1 ppm, a polyester resin containing a large amount of fine particles, which has not undergone a fine particle removal step is added to the polyester resin having low fine particle content, or fine particles recovered from the treatment water or fine particle removal step are added.

In the above-mentioned water treatment method, the treatment water is adjusted so that it satisfies at least one of the following formulas (1) to (4):

(1) $0.001 \leq N \leq 10.0$ (ppm)
(2) $0.001 \leq C \leq 5.0$ (ppm)
(3) $0.001 \leq M \leq 2.0$ (ppm)
(4) $0.01 \leq S \leq 10.0$ (ppm)

wherein N is a sodium content, C is a calcium content, M is a magnesium content and S is a silicon content, and the water used for the treatment has a total content of the above-mentioned metals of not more than 20 ppm.

In the above-mentioned method, the Na content N of the treatment water is $0.001 \leq N \leq 10.0$ (ppm) and the lower limit is preferably 0.003 ppm, more preferably 0.005 ppm, most preferably 0.01 ppm, wherein the upper limit is preferably 5.0 ppm, more preferably 1.0 ppm, most preferably 0.5 ppm.

The Ca content C of the treatment is $0.001 \leq C \leq 5.0$ (ppm), wherein the lower limit is preferably 0.003 ppm, more preferably 0.005 ppm, most preferably 0.01 ppm, and the upper limit is preferably 1.0 ppm, more preferably 0.5 ppm, most preferably 0.3 ppm, particularly preferably 0.1 ppm.

The Mg content M of the treatment water is $0.001 \leq M \leq 2.0$ (ppm), wherein the lower limit is preferably 0.003 ppm, more preferably 0.005 ppm, most preferably 0.01 ppm, wherein the upper limit is preferably 1.0 ppm, more preferably 0.5 ppm, most preferably 0.3 ppm, particularly preferably 0.1 ppm.

The Si content S of the treatment water is $0.01 \leq S \leq 10.0$ (ppm), wherein the lower limit is preferably 0.03 ppm, more preferably 0.05 ppm, most preferably 0.1 ppm, wherein the upper limit is preferably 2.0 ppm, more preferably 1.0 ppm, most preferably 0.5 ppm, particularly preferably 0.3 ppm.

The treatment water preferably satisfies all of $N \leq 10.0$ (ppm), $C \leq 5.0$ (ppm), $M \leq 2.0$ (ppm) and $S \leq 10.0$ (ppm).

The total of N, C, M and S is not more than 20 ppm, preferably not more than 10 ppm, more preferably not more than 5 ppm, most preferably not more than 3 ppm.

A method for controlling the Na content, Mg content, Ca content and Si content of the treatment water in the treatment tank is exemplarily shown in the following, to which the present invention is not limited.

The Na content, Mg content, Ca content and Si content of the treatment water in the treatment tank can be controlled by setting an apparatus for removing metals (inclusive of metal-containing substances) such as Na, Mg, Ca, Si and the like at one or more points during the steps before sending the industrial water to the treatment tank. Such an apparatus is exemplified by ion exchange apparatus, coagulant precipitation apparatus, electrolytic desiliconizing apparatus and the like. In addition, a filter may be set to remove particles of clay minerals such as silicon dioxide, aluminosilicate and the like.

Alternatively, an apparatus for removing Na, Mg, Ca and Si may be set in the at least one point before the treatment water discharged from the treatment tank is returned to the treatment tank.

In the above-mentioned water treatment method, the water to be supplied from the outside of the system is preferably 0.01–30 $CaCO_3$ mg/l. In addition, the water to be supplied preferably has a chemical oxygen demand (COD) of 0.01–10 mg/l. When the hardness exceeds 30 $CaCO_3$ mg/l, the resin shows accelerated crystallization rate, which in turn may give rise to the shrinkage of the finish part during crystallization treatment, deformation of the finish part and the like, as well as increased haze of bottlebody and the like. These problems are attributable to the attachment of the metal components of the treatment water to the resin, which act as crystal nuclei. When COD exceeds 10 mg/l, moreover, the formed article may be colored or odor may be generated. Such is considered to be due to the organic components attached to the resin, which are decomposed by the high temperature during forming.

The method for measuring the hardness of water may be, for example, chelate titration method, and COD is measured by, for example, an oxygen demand due to potassium permanganate method described in JIS.

The hardness of water can be adjusted by treating the water to be supplied with an ion exchange resin. COD can be adjusted by a method wherein the water to be supplied is treated with an adsorbent such as active charcoal and the like, a method wherein the water is treated with an oxidating agent such as hydrogen peroxide and the like, or other method. Such step can be added to the above-mentioned water treatment method as necessary.

When water is treated by the batch method, a silo type treatment tank is preferably used. In addition, contact with water may be made more efficient by conducting water treatment while casting polyester resin chips into a rotary treatment cylinder tank and rotating the tank.

In the batch method, polyester resin chips are cast into a treatment tank, the treatment water is filled, which water is circulated continuously or intermittently as necessary, the treatment water is partially discharged continuously or intermittently and new treatment water is added. After the water treatment, the entire amount of the polyester resin chips is extracted from the treatment tank. The treatment water to be used and a method for adjusting the components contained and the like may be the same as those mentioned above with regard to the above-mentioned successive method.

The water treatment other than the method mentioned above is a method wherein the polyester resin chips are brought into contact with water vapor or a water vapor-containing gas. In this case, the water vapor-containing gas or water vapor-containing air at a temperature of 50–150° C., preferably 50–110° C., is preferably supplied in a proportion of not less than 0.5 g as water vapor per 1 kg of granular polyethylene terephthalate, or, in the presence thereof, granular polyethylene terephthalate is brought into contact with water vapor. The polyester resin chips are brought into contact with water vapor generally for 10 minutes–2 days, preferably 20 minutes–10 hours.

A method of industrial contact treatment of granular polyethylene terephthalate and water vapor or a water vapor-containing gas is exemplified in the following, to which the invention is not limited. This treatment method may be a successive method or a batch method.

When polyester resin chips are contacted with water vapor by the batch method, a silo type treatment apparatus is used. That is, polyester resin chips are cast into a silo, water vapor or a vapor-containing gas is supplied by the batch method for contact treatment. Alternatively, contact may be made more efficient by conducting contact treatment while casting granular polyethylene terephthalate into a rotary contact treatment cylinder apparatus and rotating the apparatus.

In the case of a successive method, granular polyethylene terephthalate is cast from the upper part of a tower treatment apparatus and water vapor is continuously supplied parallel current flow or countercurrent flow, whereby the water vapor is subjected to a contact treatment.

The polyester resin chips that underwent water treatment as mentioned above are dewatered by a dewatering apparatus such as a vibrating screen and the like and subsequently dried. The water separated form the polyester resin chips by a dewatering apparatus may be subjected to a treatment with the above-mentioned fine particle removal apparatus and used again for a water treatment.

The polyester resin chips upon water treatment can be dried according to the dry treatment method generally used for polyester resin. For a successive drying method, a hopper air dryer is generally used, wherein polyester resin chips are supplied from the upper part and a drying gas is aerated from the lower part thereof. For efficient drying method using less drying gas, a continuous drying machine of a rotary disc type heating device is used, whereby heated water vapor, heated medium and the like are added while aerating the disc or external jacket with a small amount of a drying gas, whereby polyester resin chips can be indirectly heated and dried.

For drying by the batch method, a double cone type rotary dryer is used in vacuo or while aerating a small amount of a drying gas in vacuo. Alternatively, drying may be conducted with aeration of a drying gas under normal pressurization.

The drying gas may be air, but the dry nitrogen and dehumidified air are preferable for the prevention of decrease in molecular weight due to hydrolysis and thermal oxidation decomposition of the polyester resin.

The polyester resin of the present invention can be formed to give a molded product having superior transparency and heat resistance by a known method such as hot parison method, cold parison method and the like. In addition, molded products such as a film, a sheet and the like and multi-layer blow molded products can be produced.

The polyester resin of the present invention can be preferably used as a stretch blow molded container, a packaging material such as a tray, a biaxially oriented film and the like, and a material for metal can coating film and the like. In addition, the polyester resin of the present invention can be used as a material for one constituent layer of a multi-layer molded product, a multi-layer film and the like.

The present invention is explained in detail by illustrative examples and comparative examples, to which the present invention is not limited in any way. The present invention can be modified as necessary within the gist of the invention, which mode is also encompassed in the technical scope of the present invention.

The measurement methods of main properties referred to in the present specification are explained in the following.

(1) Intrinsic viscosity (IV) of polyester resin

Determined from a solution viscosity at 30° C. in a mixed solvent of 1,1,2,2-tetrachloroethane/phenol (2:3 weight ratio).

(2) Diethylene glycol content (hereinafter DEG content) of polyester resin

A polyester resin was decomposed with methanol, DEG amount was quantitatively determined by gas chromatography and expressed by the percentage (mol %) relative to the entire glycol component.

(3) Cyclic trimer content (hereinafter CT content) of polyester resin

A sample (300 mg) was dissolved in a mixture (3 ml) of hexafluoroisopropanol/chloroform (volume ratio=$2/3$), and chloroform (30 ml) was added for dilution. Thereto was added methanol (15 ml) and the polymer was precipitated, which was followed by filtration. The filtrate was evaporated to dryness, adjusted to a constant volume with dimethylformamide (10 ml) and subjected to high performance liquid chromatography to quantitatively determine a cyclic trimer.

(4) Acetaldehyde content (hereinafter AA content) of polyester resin

A solution of sample/distilled water=1 g/2 ml was placed in a glass ampoule substituted with nitrogen and the top was melt-sealed, which was followed by extraction at 160° C. for 2 hours. After cooling, acetaldehyde in the extract was determined by gas chromatography.

(5) Na content, Ca content and Mg content of polyester resin

A sample (ca. 5–10 g) was placed in a platinum crucible and ashed at about 550° C. The ash was dissolved in 6N hydrochloric acid and the mixture was evaporated to dryness. The residue was dissolved in 1N hydrochloric acid. This solution was measured by atomic absorption analysis method.

(6) Si content of polyester resin

A sample (ca. 5–10 g) was placed in a platinum crucible and ashed at about 550° C. To the ash was added sodium carbonate and the mixture was dissolved by heating and then dissolved in 1N hydrochloric acid. This solution was measured by inductively coupled plasma atomic emission spectroscopy apparatus manufactured by SHIMADZU Corporation.

(7) Fine particle content of polyester resin chip

Measurement 1

Examples 3, 4 and 17–21, Comparative Examples 3–5 and 10–13

Using a standard 10.5 mesh screen according to JIS-Z-8801, 1000 kg of the sample was screened. The fine particles that passed through the screen were weighted and the content was calculated. The same results were obtained by the use of a standard nominal size 1.7 mm screen according to JIS-Z-8801 instead of the standard 10.5 mesh screen according to JIS-Z-8801.

Measurement 2

Examples 5–16, Comparative Examples 6–9

A resin (ca. 0.5 kg) was placed on a screen (diameter 30 cm, according to JIS-Z-8801) having a metal net with a 10.5 mesh placed thereon, and a 0.1% aqueous cationic surfactant (alkyl trimethyl ammonium chloride) solution was showered thereon at a flow amount of 2 L/min, and shaken at a total amplitude of about 7 cm, 60 reciprocation/1 min for 1 minute. This motion was repeated until a total amount of 10–30 kg of the resin was shaken.

The fine particles shaken off were collected by filtering through a 1G1 glass filter (fine pore size 100–120 μm) manufactured by IWAKI GLASS Co., Ltd. together with an aqueous solution of the surfactant and washed with ion exchange water. This was dried in a dryer with the glass filter at 100° C. for 2 hours, cooled and weighed. The same step of washing with ion exchange water and drying was repeated. After confirmation that he fine particles after drying and the weight of the glass filter reached the constant weights, the weight of glass filter was subtracted to give the weight of the fine particle. By the fine particle content is meant fine particle amount/total weight of screened resin. The same results were obtained by the use of a standard nominal size 850 μm screen according to JIS-Z-8801 instead of the standard 10.5 mesh screen according to JIS-Z-8801.

(8) Increase of cyclic trimer amount (ΔCT) upon melting polyester resin

Dried polyester resin chips (3 g) were placed in a glass test tube, and immersed in an oil bath at 290° C. under a nitrogen atmosphere for 60 minutes and melted. An increase of cyclic trimer amount upon melting was calculated by the following formula.

*Increase of cyclic trimer amount upon melting (wt %)=[cyclic trimer content (wt %) after melting–cyclic trimer content (wt %) before melting]*

(9) Density of polyester resin

Determined by density gradient tube of mixed solvent of carbon tetrachloride/n-heptane at 25° C.

(10) Evaluation of staining of mold (Evaluation of unoriented sheet)

A polyester resin was melt-extruded to give a 0.3 mm thick unoriented sheet, which was subjected to continuous forming at a mold temperature 165° C., pressing against mold 1.0 second, cycle time 1.2 seconds [(mold pressing 1.0 second+release from mold 0.2 second)/once]. The number of repeats of forming up to staining of the mold was used to evaluate staining of the mold.

(Evaluation of biaxially stretched blow molded container)

A polyester resin was dried in a dryer using demoistured air, and a preform was prepared from M-100 injection molding machine manufactured by Meiki Seisakusyo Co., Ltd. at a resin temperature of 290° C. The finish part of this preform was heat-crystallized in an own-made finish part crystallization apparatus, and subjected to biaxial stretch blow molding using LB-01 stretch blow molding machine manufactured by Krupp Corpoplast Mashimenbau GmbH, which was followed by heat-setting in a mold set to about 155° C. for 7 or 10 seconds to give a 350 or 500 ml stretch blow molded container. Successive stretch blow molding under the same conditions was performed and the staining of the mold was evaluated by the number of forming up to the loss of transparency of the container by visual observation. As a haze measurement sample, the body of container after 5,000 times of continuous forming was used.

(11) Tc1 (DSC measurement)

The measurement was done with a differential scanning calorimeter (DSC), RDC-220 manufactured by Seiko Instrument Co., Ltd. A sample (10 mg) from the center portion of the 2 mm thick plate of the stepped square plate molded article of the following (13) was used at a temperature raising rate of 20° C./min.

(12) haze (%)

A sample was cut out from a body of a stretch blow molded container (thickness about 0.4 mm) and subjected to the measurement using a haze meter manufactured by NIHON DENSHOKU KOUGYO Co., Ltd.

(13) Injection molding of polyester resin

A dried polyester resin was formed by a M-100 injection molding machine manufactured by Meiki Seisakusyo Co., Ltd. at a cylinder temperature of 290° C. using a stepped square plate mold (molded weight about 146 g) cooled to 10° C. The stepped square plate mold comprised about 3 cm×about 5 cm square plates having a thickness of 2, 3, 4, 5, 6, 7, 8, 9, 10 and 11 mm, that were arranged like stairs. An average of 3 molded articles were taken as the measurement value. The 2 mm thick plate was used for the Tc1 measurement by DSC.

(14) Increase of density upon heating bottle finish part

The bottle finish part was heat-treatment for 60 seconds by a home made infrared heater, and a sample was taken from the top plane, from which the density was measured.

(15) Fine particle amount (ppm) in the treatment water in the treatment tank

Treatment water (1,000 ml) that passed through a 20 mesh screen according to JIS-Z-8801 was taken from the treatment water in the treatment tank through a discharge opening, and filtered through a 1G1 glass filter (fine pore size 100–120 μm) manufactured by IWAKI GLASS Co., Ltd. The fine particles left on the glass filter and the glass filter were dried at 100° C. for 2 hours, cooled under room temperature, and weighed.

(16) Na content, Ca content, Mg content and Si content (ppm) in treatment water

Treatment water was taken from the treatment water in the treatment tank through a discharge opening, and filtered through a 1G1 glass filter (fine pore size 100–120 μm) manufactured by IWAKI GLASS Co., Ltd. The filtrate was measured by an inductivity coupled plasma emission spectrometry apparatus manufactured by SHIMADZU Corporation.

(17) Determination of particle size and number of particles in water

Measured using a light blocking particle counter (HIAC/ROYCO Counter 4100, Sampler 3000, manufactured by Pacific Scientific Company).

EXAMPLE 1 AND COMPARATIVE EXAMPLE 1

Example 1

Using a 320 L tower treatment apparatus (FIG. 1) equipped with a starting material chip supply port (1) on the top of a treatment tank (2), a new treatment water inlet (9), an overflow discharge opening (3) located at the upper limit level of the treatment water in the treatment tank (2), a discharge opening (4) of a mixture of polyester resin chips and treatment water, which is located at a lower part of the treatment tank (2), a pipe (7) that sends back to the water treatment tank (2) the treatment water discharged from the overflow discharge opening and the treatment water that was discharged from the discharge opening at the lower part of the treatment tank (2) and passed through a dewatering apparatus (5) of polyester resin chips, after passing through a filtering apparatus (6) wherein a filtering material is a 30 μm belt paper filter, and an inlet (8) of the treatment water after fine particle removal treatment, and using ion exchange water as the treatment water to be introduced, polyethylene terephthalate (hereinafter abbreviated as PET) chips were treated with water.

PET chips having an intrinsic viscosity of 0.75 dl/g, a density of 1.400 g/cm$^3$ and a cyclic trimer content of 0.33 wt % were continuously cast into a water treatment tank (2) containing treatment water controlled to a temperature of 95° C. at a rate of 50 kg/hours from the top (1) of the treatment tank (2). After 5 hours from the initiation of casting, PET chips were extracted at a rate of 50 kg/hours together with the treatment water from the discharge opening (4) of the water treatment tank (2) while keeping casting the PET chips into the water treatment tank (2), concurrently with which the treatment water passed through a dewatering apparatus (5) was returned to the water treatment tank (2) via the filtration apparatus (6) to initiate the recycled use. PET chips from the dewatering apparatus (5) and the treatment water discharged from a discharge opening (4) at the lower part of the treatment tank (2) were sampled at 10, 15, 24 and 72 hours after the initiation of extraction of the PET chips. The fine particle amount was determined for the sampled treatment water.

The above-mentioned PET chip subjected to sampling were dried under reduced pressure, and formed into a preform of bottles by M-100 injection molding machine manufactured by Meiki Seisakusyo Co., Ltd. The injection molding temperature was 295° C. Then, the finish part of this preform was heated with a home made near infrared heater for crystallization of the finish part. This preform was subjected to biaxial stretch blowing with LB-01E molding machine manufactured by Krupp Corpoplast Mashimenbau GmbH by about 2.5 times in the longitudinal direction, and about 5 times in the circumferential direction, the original to give a 1500 ml volume container. The stretching temperature was controlled to 100° C.

The properties of the polyester resin container obtained in Example 1 and the fine particle amount in the treatment water are shown in Table 1.

Comparative Example 1

In the same manner as in Example 1 except the fine particle removal apparatus (6) for the treatment water as used in Example 1 was removed and the corresponding part was changed to a direct connection pipe, the procedure was done. The results are shown in Table 1.

TABLE 1

| Time (hours) after extraction of polyester resin chips | Example 1 | | Comparative Example 1 | |
|---|---|---|---|---|
| | haze (%) of container | fine particle (ppm) in treatment water* | haze (%) of container | fine particle (ppm) in treatment water* |
| 10 | 1.1 | 142 | 4.2 | 754 |
| 15 | 1.2 | 160 | 5.4 | 1320 |
| 24 | 2.2 | 223 | 5.9 | 1454 |
| 72 | 1.4 | 218 | 5.7 | 1448 |

Note *The treatment water discharged with polyester resin chip.

As shown in Table 1, the fine particle amount in the treatment water from Comparative Example 1 kept increasing and the transparency of the obtained molded article became gradually poor. On the other hand, as in Example 1, the fine particles in the treatment water in the treatment tank was set to not more than 1,000 ppm, whereby the obtained molded article maintained superior transparency, and the shrinkage ratio of the finish part was found to be well maintained.

EXAMPLE 2 AND COMPARATIVE EXAMPLE 2

Example 2

Using the same treatment apparatus (FIG. 1) as used in Example 1, except that an apparatus (11) for removing particles in water, which is a GAF filter bag PE-1P2S (polyester resin felt, filtration accuracy 1 μm) manufactured by ISP Corp., was set before the new treatment water inlet (9) and the filtration apparatus (6) was a continuous filter having 30 μm filtering paper material, and using, as the treatment water to be introduced, natural water (river-bed water) that passed through the apparatus (11) for removing particles in water, PET chips were treated with water.

PET chips having an intrinsic viscosity of 0.75 dl/g, a density of 1.400 g/cm$^3$ and a cyclic trimer content of 0.33 wt % were continuously cast into the water treatment tank (2) containing treatment water controlled to a temperature of 95° C. at a rate of 50 kg/hours from the supply port (1) of the treatment tank (2). The water treatment was carried out for 5 hours while successively extracting PET chips at a rate of 50 kg/hours together with the treatment water from the discharge opening (4) at the lower part of the water treatment tank (2).

The above-mentioned PET chips after the treatment were dewatered and dried, and subjected to biaxial stretch blow molding, whereby a preform of bottles was made by M-100 injection molding machine manufactured by Meiki Seisakusyo Co., Ltd. The injection molding temperature was 295° C. Then, the finish part of this preform was heated with a home made near infrared heater for crystallization of the finish part. This preform was subjected to biaxial stretch blowing with LB-01E molding machine manufactured by Krupp Corpoplast Mashimenbau GmgH by about 2.5 times in the longitudinal direction, and about 5 times in the circumferential direction, the original to give a 1500 ml volume container (body thickness 0.4 mm). The stretching temperature was controlled to 100° C. In addition, the water taken from the ion exchange water inlet (9) of the above-mentioned water treatment apparatus was measured for the content of particles having a particle size of 1–25 μm. The haze of the polyester resin container obtained in Example 2 and the number of fine particles in the water from the ion exchange water inlet (9) are shown in Table 2.

Comparative Example 2

In the same manner as in Example 2 except the particle removal apparatus (11) as used in Example 2 was not used and the corresponding part was changed to a direct connection pipe, the procedure was done. The haze of the container and the number of fine particles in the ion exchange water from the inlet (9) are shown in Table 2.

TABLE 2

| Example 2 | | Comparative Example 2 | |
|---|---|---|---|
| Haze of container (%) | Number of particles in water (particles/10 ml) | Haze of container (%) | Number of particles in water (particles/10 ml) |
| 0.8 | 3195 | 6.5 | 514587 |

As shown in Table 2, the molded article obtained by the treatment of Comparative Example 2 shows poor transparency. It has been found that, by setting the number of the particles having a particle size of 1–25 μm, that are in the treatment water to be introduced from the outside the system, to 1–50,000 particles/10 ml, as in Example 2, the obtained molded article can have superior transparency.

EXAMPLES 3, 4 AND COMPARATIVE EXAMPLES 3–5

Example 3

Into a first esterification reaction vessel containing a reaction product in advance was successively supplied a slurry of highly pure terephthalic acid and ethylene glycol, and reaction was carried out with stirring at about 250° C., 0.5 kg/cm$^2$ G for an average resident hours of 3 hours. Separately, crystalline germanium dioxide was heat dissolved in water, ethylene glycol was added thereto and the mixture was heat treated to give a catalyst solution. This catalyst solution and a solution of phosphoric acid in ethylene glycol were separately supplied successively to this first esterification reaction vessel. The resulting reaction product was transferred to a second esterification reaction vessel, and a reaction was carried out with stirring at about 260° C., 0.05 kg/cm$^2$ G to a predetermined reaction degree. This esterification reaction product was successively sent to the first polymerization reaction vessel and polymerized with stirring at about 265° C., 25 torr for 1 hour, and then in the second polymerization reaction vessel with stirring at about 265° C., 3 torr for 1 hour, and then in the third polymerization reaction vessel with stirring at about 275° C., 0.5–1 torr for 1 hour. The obtained PET resin showed a IV of 0.53 dl/g and a DEG content of 2.7 mol %.

This resin was sequentially crystallized under a nitrogen atmosphere at about 155° C. and preheated under a nitrogen atmosphere to about 200° C. The resin was sent to a continuous solid phase polymerization reaction vessel and subjected to solid phase polymerization under a nitrogen atmosphere at about 205° C. After the solid phase polymerization, the resin was treated successively by a fine particle removal step and a screening step using a vibrating screen, whereby fine particles were removed.

The obtained PET resin showed an intrinsic viscosity of 0.74 dl/g, a cyclic trimer content of 0.30 wt %, and a density of 1,400 g/cm$^3$.

The PET resin chips were treated with water using the same treatment apparatus (FIG. 1) as used in Example 1, except that the filtration apparatus (6) was a continuous filter having a 30 μm filtering paper material and an adsorption tower (12) packed with activated carbon granules for the adsorption treatment of acetaldehyde in the treatment water after fine particle removal was equipped, and using ion exchange water as the treatment water to be introduced.

PET were continuously cast into the water treatment tank (2) containing treatment water controlled to a temperature of 95° C. at a rate of 50 kg/hours from the supply port (1) of the treatment tank (2). The water treatment was carried out for 4 hours using the treatment water having a fine particle content of about 130 ppm. The resin was successively extracted together with the treatment water from the discharge opening (4) at a lower part of the treatment tank (2) at a rate of 50 kg/hours in terms of the PET chip. The obtained PET resin had a fine particle content of 35 ppm, and a cyclic trimer increase (ΔCT) upon melting of 0.04 wt %.

With regard to this composition, evaluation as an unoriented sheet and evaluation as a stretch blow molded bottle were conducted. The results are shown in Table 3. Continuous stretch blow molding of not less than 5,000 cycles was performed, but staining of the mold was not found and the bottles had superior transparency. These containers were filled with hot water at 90° C., and capped by a capping machine. Then the bottles were made to fall down and left standing. The deformation of the finish part, and leakage of the content were examined. The bottles were free of problems.

As shown in Table 3, the body haze was 1.5% of the obtained bottles were fine. The number of formings until the mold was stained was 13,000, which was free of problem.

Example 4

The water treatment was conducted in the same manner as in Example 3, except using the treatment water having a fine particle content of about 350 ppm, and using the same PET resin that underwent the same solid phase polymerization as in Example 3, and similar water treatment apparatus. The results are shown in Table 3.

As shown in Table 3, the obtained polyester resin had a fine particle content of 120 ppm, and a cyclic trimer increase (ΔCT) upon melting of 0.05 wt %. The body haze was 1.7%. The number of formings until the mold was stained was 15,000, which was free of problem.

Comparative Example 3

A PET resin that underwent the same solid phase polymerization as performed in Example 3 was immersed in distilled water in a glass container, heated from the outside to allow treatment at an inner temperature of about 95° C. for 4 hours. This was dried to give a PET resin. The results are shown in Table 3.

As shown in Table 3, the obtained polyester resin had a fine particle content of 0.01 ppm, and a cyclic trimer increase (ΔCT) upon melting of 0.05 wt %. The shrinkage percentage of the obtained bottle was outside the standard value to make normal capping unattainable. The mold was heavily stained, and the obtained bottle had a body haze of 6.8%, showing poor transparency.

Comparative Example 4

The same solid phase polymerization as in Example 3 was conducted. Using the PET resin thus obtained and the same water treatment tank (2), water treatment was conducted in the same manner as in Example 3, except that the treatment water having a fine particle content of about 3,000 ppm. The results are shown in Table 3.

As shown in Table 3, the obtained polyester resin had a fine particle content of 1,000 ppm, and a cyclic trimer increase (ΔCT) upon melting of 0.05 wt %. The shrinkage percentage of the obtained bottle was outside the standard value. Hot water at 90° C. was filled in this bottle, and capped by a capping machine. Then the bottle was made to fall down and left standing. The leakage of the content was examined. As a result, leakage of the content was observed.

The number of formings until the mold was stained was 28,000, which was free of problem, but the obtained bottle showed a body haze of 7.2%, showing poor transparency.

Comparative Example 5

A PET resin was produced under the same melt polycondensation and solid phase polymerization conditions as in Example 3. By decreasing the weight per hour of PET resin to be treated to about 1/10 of that in Example 3 to increase the efficiency of the screening step and fine particle removal step, a PET having a fine particle content of 0.05 ppm was obtained. This PET resin was formed under the same conditions as in Example 3 without water treatment to give bottles. The results are shown in Table 3.

The obtained bottle showed a shrinkage percentage of the finish part was outside the standard value to make normal capping unattainable. As shown in Table 3, the mold was heavily stained, and the obtained bottle had a body haze of 8.2%, showing poor transparency.

TABLE 3

|  | Example 3 | Example 4 | Comparative Example 3 | Comparative Example 4 | Comparative Example 5 |
|---|---|---|---|---|---|
| fine particle content (ppm) | 35 | 120 | 0.01 | 1000 | 0.05 |
| intrinsic viscosity (dl/g) | 0.74 | 0.74 | 0.74 | 0.74 | 0.75 |
| CT amount (wt %) | 0.30 | 0.30 | 0.30 | 0.30 | 0.33 |
| ΔCT amount (wt %) | 0.04 | 0.05 | 0.05 | 0.05 | 0.54 |
| Number of sheet forming until mold staining (m) | >10000 | >10000 | 3800 | >10000 | 2300 |
| Number of contact forming until mold staining (times) | 13000 | 15000 | 4000 | 28000 | 1400 |
| Bottle haze (%) | 1.5 | 1.7 | 6.8 | 7.2 | 8.2 |

EXAMPLE 5–8 AND COMPARATIVE EXAMPLE 6

Example 5

Using the same treatment apparatus (FIG. 1) as used in Example 1 except that an ion exchange apparatus (10) consisting of a tower of Amberlite IR124 ($H^+$ type) and a tower of Amberlite IRA402 ($OH^-$ type) for removing Na, Mg, Ca and Si in the industrial water was set in front of a new treatment water inlet (9), and using industrial water (ground water) that passed through the ion exchange apparatus (10), PET chips were subjected to a water treatment.

PET chips having an intrinsic viscosity of 0.75 dl/g, a density of 1.400 g/cm$^3$ and a cyclic trimer content of 0.33 wt % were continuously cast into a water treatment tank (2) containing treatment water controlled to a temperature of 95° C. at a rate of 50 kg/hours from the top (1) of the treatment tank (2). After 5 hours of water treatment, PET chips were successively extracted at a rate of 50 kg/hours together with the treatment water from the discharge opening (4) at a lower part of the water treatment tank (2). After 72 hours of continuous operation, the treatment water discharged from the dewatering apparatus (5) was sampled, which passed through the discharge opening (4) at the lower part of the treatment tank (2) together with the PET chips.

The PET chips that underwent the above-mentioned sampling were dried under reduced pressure and a bottle perform was made by M-100 injection molding machine manufactured by Meiki Seisakusyo Co., Ltd. The injection molding temperature was 295° C. This perform was subjected to biaxial stretch blowing with LB-01E molding manufactured by Krupp Corpoplast Mashimembau GmbH by about 2.5 times in the longitudinal direction, and about 5 times in the circumferential direction, the original to give a 1500 ml volume container. The stretching temperature was controlled to 100° C.

The properties of the obtained polyester resin container and Na, Mg, Ca and Si contents of the treatment water are shown in Table 4.

Example 6

In the same manner as in Example 5, except that the ion exchange apparatus was charged to a mixed bed type ion exchange apparatus of Amberlite IR124 ($H^+$ type) and Amberlite IRA402 ($OH^-$ type), water treatment was performed. In the same manner as in Example 5, a container was prepared using the obtained chip. The results are shown in Table 4.

Example 7

In the same manner as in Example 5, except that the kind of the ion exchange resin were changed to Amberlite IR120B ($H^+$ type) and Amberlite IRA410 ($OH^-$ type) and the amount used thereof was reduced to a half of that in Example 5, water treatment was performed. In the same manner as in Example 5, a container was prepared using the obtained chip. The results are shown in Table 4.

Example 8

In the same manner as in Example 7, except that the amount used of the ion exchange resin was reduced to one-fifth of that in Example 5 and ground water from other place was used, water treatment was performed. In the same manner as in Example 5, a container was prepared using the obtained chip. The results are shown in Table 4.

Comparative Example 6

In the same manner as in Example 5 except that the ion exchange apparatus (10) to remove Na, Mg, Ca and Si in the industrial water used in Example 5 was removed and the corresponding part was changed to a direct connection pipe, the procedure was done.

TABLE 4

|  |  | In treatment water | | | |
|---|---|---|---|---|---|
|  | Haze of container (%) | sodium (ppm) | magnesium (ppm) | calcium (ppm) | silicon (ppm) |
| Example 5 | 1.5 | 0.05 | 0.02 | 0.02 | 0.13 |
| Example 6 | 1.4 | 0.002 | Not detected | 0.006 | 0.04 |
| Example 7 | 2.1 | 0.07 | 0.04 | 0.09 | 0.27 |
| Example 8 | 3.2 | 0.02 | 0.12 | 0.53 | 1.7 |
| Comparative Example 6 | 8.4 | 6.4 | 1.7 | 6.3 | 12.5 |

As is evident from Table 4, adjustment of the Na content, Mg content, Ca content and Si content of the treatment water in the treatment tank (2) in the present invention to fall within a constant range, the obtained molded article showed superior transparency. The treatment water of Comparative Example 6 showed high Na, Mg, Ca and Si contents, and the molded article obtained by the treatment had poor transparency.

EXAMPLES 9–12 AND COMPARATIVE EXAMPLE 7

Example 9

Using the same treatment apparatus and PET chips used in Example 5, PET chips were subjected to water treatment in the same manner as in Example 5.

The obtained PET chips by the above-mentioned water treatment were formed in the same manner as in Example 5 to give a polyester resin container.

The properties of the obtained polyester resin container and Na, Mg, Ca and Si contents of the treatment water are shown in Table 5.

Example 10

In the same manner as in Example 9, except that the amount used of the ion exchange resin was the same as in Example 6, water treatment was performed. In the same manner as in Example 9, a container was prepared using the obtained chip. The results are shown in Table 5.

Example 11

In the same manner as in Example b 9, except that the amount used of the ion exchange resin was the same as in Example 7, water treatment was performed. In the same manner as in Example 9, a container was prepared using the obtained chip. The results are shown in Table 5.

Example 12

In the same manner as in Example 9, except that the amount used and the kind of the ion exchange resin were the same as in Example 7 and the water to be introduced into the ion exchange apparatus was river bed water, water treatment was performed. In the same manner as in Example 9, a container was prepared using the obtained chip. The results are shown in Table 5.

Comparative Example 7

In the same manner as in Example 9 except that the ion exchange apparatus (10) to remove Na, Mg, Ca and Si in the industrial water used in Example 9 was removed and the corresponding part was changed to a direct connection pipe, the procedure was done.

TABLE 5

| | Haze of container (%) | In treatment water | | | |
| --- | --- | --- | --- | --- | --- |
| | | sodium (ppm) | magnesium (ppm) | calcium (ppm) | silicon (ppm) |
| Example 9 | 1.6 | 0.04 | 0.02 | 0.03 | 0.12 |
| Example 10 | 1.5 | 0.002 | Not detected | 0.005 | 0.03 |
| Example 11 | 2 | 0.07 | 0.05 | 0.09 | 0.25 |
| Example 12 | 3 | 1.14 | 0.03 | 0.1 | 0.15 |
| Comparative Example 7 | 8.4 | 6.4 | 1.7 | 6.3 | 12.7 |

As is evident from Table 5, adjustment of the Na content, Mg content, Ca content and Si content of the treatment water in the treatment tank (2) in the present invention to fall within a constant range, the obtained molded article showed superior transparency. The treatment water of Comparative Example 7 showed high Na, Mg Ca and Si contents, and the molded article obtained by the treatment had poor transparency.

EXAMPLES 13–15 AND COMPARATIVE EXAMPLE 8

Example 13

Using the same treatment apparatus (FIG. 1) as used in Example 7 except that an ion exchange apparatus (10) consisting of a tower of Amberlite IR120B ($H^+$ type) and a tower of Amberlite IRA410 ($OH^-$ type) (both amounts used being half the amount in Example 7) was set in front of a new treatment water inlet (9), and adsorption tower (12) packed with activated carbon granules for adsorption treatment of acetaldehyde and the like in the treatment water after fine particle removal was set, and using ion exchange water as the treatment water to be introduced, PET chips were subjected to a water treatment.

PET chips having an intrinsic viscosity of 0.75 dl/g, a density of 1.399 g/cm$^3$ and a cyclic trimer content of 0.32 wt % were continuously cast into a water treatment tank (2) containing treatment water adjusted to have a Ca content of about 0.2 ppm, an Mg content of about 0.1 ppm and an Si content of about 0.5 ppm by an ion exchange apparatus (10) and controlled to a temperature of 95° C. at a rate of 50 kg/hours from the top (1) of the treatment tank (2). After 5 hours of casting, PET chips were successively extracted at a rate of 50 kg/hours together with the treatment water from the discharge opening (4) at a lower part of the water treatment tank (2) while casting the PET chip into the water treatment tank (2). The treatment water that passed the dewatering apparatus (5) was returned back to the water treatment tank (2) via the filtration apparatus (6) and continuous operation was maintained. After 72 hours of continuous operation, the treatment water discharged, together with the PET chips from the discharge opening (4), had a Ca content of about 0.1 ppm, an Mg content of about 0.07 ppm and an Si content of about 0.5 ppm, and the PET chips simultaneously obtained had a Ca content of 0.3 ppm, an Mg content of 0.05 ppm and an Si content of 0.8 ppm. ΔCT was 0.08 wt %. The acetaldehyde amount was 2.5 ppm and fine particle amount was 63 ppm.

The density of the top plane of the finish part of the hollow container obtained in the above-mentioned (10) using this PET, was 1.379 g/cm$^3$ upon heating with an infrared heater, which was free of problem, and the body haze was 0.9%, indicating superior transparency. The number of formings until the mold was stained was 15,000, which was free of problem.

Example 14

In the same manner as in Example 13 except that the fine particle content of the treatment water was set to about 100 ppm, Ca content was set to about 0.05 ppm, Mg content was set to about 0.03 ppm, and Si content was set to 0.2 ppm, the PET chip of Example 13 was subjected to the water treatment.

The obtained PET chip had a Ca content of 0.2 ppm, an Mg content of 0.03 ppm, an Si content of 0.5 ppm, ΔCT of 0.10 wt %, an acetaldehyde amount of 2.7 ppm, and a fine particle content of about 30 ppm.

The finish part of the hollow container obtained the above-mentioned (10) using this PET was heated with an infrared heater. The density of the top plane was 1.380 g/cm$^3$ which was without problem, the body haze was 1.2%, showing superior transparency, and the number of formings until the mold was stained was 13,000 which was free of problem.

Example 15

The PET chips obtained by the use of germanium dioxide and tetraisopropyl titanate as the polycondensation catalyst and having an intrinsic viscosity of 0.75 dl/g, a density of 1.399 g/cm$^3$, a cyclic trimer content of 0.31 wt %, a Ti residue measured by high frequency plasma light emitting analysis of 0.9 ppm and Ge residue and P residue measured by atomic absorption analysis of 16 ppm and 21 ppm, respectively, were subjected to water treatment in the same manner as in Example 13.

The obtained PET chip had a Ca content of 0.4 ppm, an Mg content of 0.06 ppm, an Si content of 0.7 ppm, ΔCT of 0.08 wt %, an acetaldehyde amount of 2.5 ppm, and a fine particle content of about 40 ppm.

The finish part of the hollow container obtained the above-mentioned (10) using this PET was heated with an infrared heater. The density of the top plane was 1.381 g/cm³ which was without problem, the body haze was 1.0%, showing superior transparency, and the number of formings until the mold was stained was 13,000, which was free of problem.

Comparative Example 8

In the same manner as in Example 13 except that the ion exchange apparatus (10) was not used and the treatment water having a Ca content of about 7.3 ppm, an Mg content of about 2.5 ppm and an Si content of 6.9 ppm was supplied to the water treatment tank (2), the PET chip of Example 13 was subjected to water treatment.

The obtained PET chip had a Ca content of 7.8 ppm, an Mg content of 5.5 ppm, an Si content of 21 ppm, ΔCT of 0.08 wt %, and a fine particle content of about 40 ppm. The hollow container obtained in the above-mentioned (10) using this PET had a very high body haze of 8.9%.

EXAMPLE 16 AND COMPARATIVE EXAMPLE 9

Example 16

Using a similar treatment apparatus as in Example 13, PET chip was subjected to a water treatment.

The PET chips having an intrinsic viscosity of 0.75 dl/g, a density of 1.399 g/cm³, a cyclic trimer content of 0.32 wt % and Ge residue and P residue measured by atomic absorption analysis of 49 ppm and 37 ppm, respectively, were continuously cast into the water treatment tank (2) containing the treatment water adjusted to have an Na content of about 0.05 ppm by ion exchange apparatus (10) and having a temperature of 95° C. at a rate of 50 kg/hours from the top (1) of the treatment tank (2). After 5 hours of casting, PET chips were successively extracted at a rate of 50 kg/hours together with the treatment water from the discharge opening (4) at a lower part of the water treatment tank (2) while keeping casting the PET chips into the water treatment tank (2). The treatment water that passed the dewatering apparatus (5) was returned back to the water treatment tank (2) via the filtration apparatus (6) and operation was maintained continuously.

After 72 hours of continuous operation, the treatment water discharged, together with the PET chips from the discharge opening (4), had an Na content of about 0.07 ppm and a fine particle content of about 100 ppm. The PET chips simultaneously obtained had an Na content of 0.1 ppm and a fine particle content of about 27 ppm. The acetaldehyde amount was 2.5 ppm and ΔCT was 0.08 wt %.

The finish part of the hollow container obtained the above-mentioned (10) using this PET was heated with an infrared heater. The density of the top plane was 1.380 g/cm³ which was without problem, the body haze was 1.1%, showing superior transparency, and the number of formings until the mold was stained was 16,000, which was free of problem.

Comparative Example 9

In the same manner as in Example 16 except that the ion exchange apparatus (10) was not used and the treatment water having an Na content of about 6.5 ppm was supplied to the water treatment tank (2), the PET chip of Example 16 was subjected to water treatment.

The PET chips obtained had an Na content of 9.8 ppm and a fine particle content of about 25 ppm. The acetaldehyde amount was 2.7 ppm and ΔCT was 0.1 wt %.

The hollow container obtained in the above-mentioned (10) using this PET had a very high body haze of 10.1%.

EXAMPLES 17–20 AND COMPARATIVE EXAMPLES 10, 11

Example 17

Into a first esterification reaction vessel containing a reaction mixture product in advance was successively supplied a slurry of highly pure terephthalic acid and ethylene glycol, and the reaction was carried out with stirring at about 250° C., 380 torr for an average resident hours of 3 hours. Separately, crystalline germanium dioxide was heat dissolved in water, ethylene glycol was added thereto and the mixture was heat treated to give a catalyst solution. This catalyst solution and a solution of phosphoric acid in ethylene glycol were separately supplied successively to this first esterification reaction vessel. The resulting reaction product was transferred to a second esterification reaction vessel, and a reaction was carried out with stirring at about 260° C., 38 torr with stirring to a predetermined reaction degree. This esterification reaction product was successively sent to the first polymerization reaction vessel and polymerized with stirring at about 265° C., 25 torr for 1 hour, and then in the second polymerization reaction vessel with stirring at about 265° C., 3 torr for 1 hour, and then in the third polymerization reaction vessel with stirring at about 275° C., 0.5–1 torr for 1 hour. The obtained PET resin showed a DEG content of 2.6 mol %.

This resin was sequentially crystallized under a nitrogen atmosphere at about 155° C. and preheated under a nitrogen atmosphere to about 200° C. The resin was sent to a continuous solid phase polymerization reaction vessel and subjected to solid phase polymerization under a nitrogen atmosphere at about 205° C. After the solid phase polymerization, the resin was treated successively by a fine particle removal step and a screening step using a vibrating screen, whereby fine particles were removed.

The obtained PET resin showed an intrinsic viscosity of 0.74 dl/g, a cyclic trimer content of 0.31 wt %, and a density of 1.400 g/cm³.

The PET resin chips were treated with water using the same treatment apparatus (FIG. 1) as used in Example 1, except that an adsorption tower (12) packed with activated carbon granules for the adsorption treatment of acetaldehyde in the treatment water after fine particle removal was equipped, and using ion exchange water as the treatment water to be introduced.

PET chips were continuously cast into the water treatment tank (2) containing treatment water controlled to a temperature of 95° C. at a rate of 50 kg/hours from the supply port (1) of the treatment tank (2). The water treatment was carried out substantially for 4 hours using the treatment water having a fine particle content of about 130 ppm. The resin was successively extracted together with the treatment water from the discharge opening (4) at a lower part of the treatment tank (2) at a rate of 50 kg/hours in terms of the PET chip. The obtained PET resin had a fine particle content of 35 ppm, and a cyclic trimer increase (ΔCT) upon melting of 0.04 wt %. Pulverized polyethylene (UE320, manufactured by Mitsubishi Chemical Corporation) was dry blended with this PET resin at about 30 ppb to give a resin mixture.

This mixture was evaluated by way of stretch blow molded bottles, but mold stain was not found and the bottle had superior transparency. Hot water at 90° C. was filled in this bottle, and capped by a capping machine. Then the bottle was made to fall down and left standing. The deformation of the finish part and the leakage of the content were examined. As a result, no problem was found.

As shown in Table 6, the obtained bottle showed a body haze of 1.5%. The number of formings until the mold was stained was 15,000, which was free of problem.

Example 18

Using a similar water treatment apparatus and PET resin that underwent similar solid phase polymerization as in Example 17, a water treatment was conducted in the same manner as in Example 17 except that the treatment water having a fine particle content of about 280 ppm was used. Then, a resin mixture was prepared in the same manner as in Example 17 except that the amount of PE resin to be dry blended was changed to about 20 ppb. The results are shown in Table 6.

As shown in Table 6, the results showed no problem, like in Example 17.

Example 19

Using a similar water treatment apparatus and PET resin that underwent similar solid phase polymerization as in Example 17, a water treatment was conducted in the same manner as in Example 17 except that the treatment water having a fine particle content of about 25 ppm was used. Then, a resin mixture was prepared in the same manner as in Example 17. The results are shown in Table 6.

As shown in Table 6, the results showed no problem, like in Example 17.

Example 20

PET resin was obtained in the same manner as in Example 17 except that polypropylene (FA3D, manufactured by Mitsubishi Chemical Corporation) was used as the polyolefin resin. The results are shown in Table 6.

As shown in Table 6, the results showed no problem, like in Example 17.

Comparative Example 10

A PET resin was produced under the same conditions as in Example 17. By decreasing the weight per hour of PET resin to be treated to about ⅒ of that in Example 17 to increase the efficiency of the screening step an fine particle removal step, a PET having a fine particle content of 0.05 ppm was obtained. This PET resin was evaluated without water treatment. The results are shown in Table 6.

As shown in Table 6, the mold was heavily stained, and the obtained bottle showed extremely poor transparency.

Comparative Example 11

In the same manner as in Example 17 except that the amount of polypropylene to be dry blended was changed to about 3,000 ppb, a resin mixture was obtained. By setting the treating rate of this resin mixture to about 10 times higher than in Example 17 and applying a screening step and a fine particle removal step using a screen of about ½ mesh, a PET resin having a greater fine particle content than in Comparative Example 10 was obtained. The results are shown in Table 6.

As shown in Table 6, only a non-transparent bottle was obtained.

TABLE 6

| | Example 17 | Example 18 | Example 19 | Example 20 | Comparative Example 10 | Comparative Example 11 |
|---|---|---|---|---|---|---|
| fine particle content (ppm) | 35 | 120 | 5 | 50 | 0.05 | 500 |
| Kind of polyolefin | PE | PE | PE | PP | — | PP |
| polyolefin content (ppb) | 30 | 20 | 30 | 100,000 | — | 3,000 |
| intrinsic viscosity (dl/g) | 0.74 | 0.74 | 0.74 | 0.74 | 0.74 | 0.74 |
| CT amount (wt %) | 0.31 | 0.30 | 0.30 | 0.30 | 0.31 | 0.32 |
| ΔCT amount (wt %) | 0.04 | 0.04 | 0.05 | 0.04 | 0.55 | 0.54 |
| Container forming (times) up to mold staining | 15,000 | 17,000 | 8,000 | 20,000 | 1,500 | >20,000 |
| Haze (%) of bottle | 1.5 | 1.8 | 1.6 | 2.0 | 7.8 | Non-transparent |

EXAMPLES 21–22 AND COMPARATIVE EXAMPLES 12–14

Example 21

In a first esterification reaction vessel containing a reaction product in advance was successively supplied a slurry of highly pure terephthalic acid and ethylene glycol, and reaction was carried out with stirring at about 250° C., 0.5 kg/cm² G for an average resident hours of 3 hours. Separately, crystalline germanium dioxide was heat dissolved in water, ethylene glycol was added thereto and the mixture was heat treated to give a catalyst solution. This catalyst solution, a solution of phosphoric acid in ethylene glycol and polyacetal resin (MI=1.0 g/10 min, density=1.41 g/cm³, 100 ppm) were separately supplied successively to this first esterification reaction vessel. The resulting reaction product was transferred to a second esterification reaction vessel, and a reaction was carried out with stirring at about 260° C., 0.05 kg/cm² G to a predetermined reaction degree. This esterification reaction product was successively sent to the first polymerization reaction vessel and polymerized with stirring at about 265° C., 25 torr for 1 hour, and then in the second polymerization reaction vessel with stirring at about 265° C., 3 torr for 1 hour, and then in the third polymerization reaction vessel with stirring at about 275° C., 0.5–1 torr for 1 hour. The obtained PET resin showed a IV of 0.54 dl/g and a DEG content of 2.7 mol %. After the completion of the reaction, the resin was taken out from the polymerization tank in the form of strands and, after cooling with water, cut into chips. This PET that underwent melt polycondensation was crystallized and subjected to solid phase polymerization at 205° C. under a nitrogen atmosphere. After the solid phase polymerization, the resin was treated successively by a fine particle removal step and a screening step using a vibrating screen, a PET resin having a fine particle content of not more than 0.1 ppm was obtained. This PET resin was treated with hot water as follows.

The PET resin chips were treated with water using the same treatment apparatus (FIG. 1) as used in Example 1, except that the filtration apparatus (6) was a continuous filter having a 30 μm filtering paper material and an adsorption tower (12) packed with activated carbon granules for the adsorption treatment of acetaldehyde in the treatment water after fin particle removal was equipped, and using ion exchange water as the treatment water to be introduced.

PET were continuously cast into the water treatment tank (2) containing treatment water controlled to a temperature of 95° C. at a rate of 50 kg/hours from the supply port (1) of the treatment tank (2). The water treatment was carried out for 4 hours using the treatment water having a fine particle content of about 500 ppm. The resin was successively extracted together with the treatment water from the discharge opening (4) at a lower part of the treatment tank (2) at a rate of 50 kg/hours in terms of the PET chip. The obtained PET resin had a fine particle content of 300 ppm.

This PET resin was formed into a board and a biaxially oriented bottle and evaluated. The results are shown in Table 7.

Example 22

From the PET composition obtained in Example 21, a 0.5 mm thick sheet was formed using an own-made sheet forming device at a barrel temperature of 290° C. This extrusion sheet was preheated by a vacuum pressure forming machine TVP-33 manufactured by MITUWA KOUGYOU Co., Ltd. at about 110° C. and a container with a lid groove (full volume about 400 ml) was formed. A lid for the aforementioned container was also formed at the same time. The container was filled, the protrusion of the aforementioned lid was inlayed in the groove of the container and the container with the lid was stood at room temperature for one month. The releasability of the lid was examined to find that the lid could be taken off easily.

Comparative Example 12

In the same manner as in Example 21 except that the polyacetal resin was not added and the efficiency of the screening step and fine particle removal step was improved by decreasing the weight per hour of PET resin to be treated to about ⅓ of that in Example 21, a PET resin having a fine particle content of 0.02 ppm was obtained.

The PET resin was evaluated without water treatment. The results are shown in Table 7.

The bottle finish part after heat treatment with an infrared heater had a low density of 1.362 (g/cm³) as shown in Table 7. Hot water at 90° C. was filled in this bottle, and capped by a capping machine. Then the bottle was made to fall down and left standing. The deformation of the finish part and the leakage of the content were examined. As a result, the deformation of the finish part and the leakage of the content were observed. The body of the bottle showed a haze of 6.3%, which was low, and the number of forming before staining of the mold was only 4000.

Comparative Example 13

In the same manner as in Example 21 except that the amount of the polyacetal resin added was changed to 2,000 ppm, a PET resin was obtained. Then, a bottle was obtained in the same manner as in Example 21.

As shown in Table 7, the bottle made from this PET resin was non-transparent.

Comparative Example 14

In the same manner as in Example 22, a container was made from the PET resin obtained in Comparative Example 12, lidded and stood for a month. The lid was removed in vain due to the protrusion of the lid tightly fit in the groove of the container.

TABLE 7

|  | Example 21 | Comparative Example 12 | Comparative Example 13 |
|---|---|---|---|
| intrinsic viscosity (dl/g) | 0.74 | 0.74 | 0.74 |
| CT amount(wt %) | 0.37 | 0.60 | 0.54 |
| ΔCT amount(wt %) | 0.05 | 0.54 | 0.40 |
| Density (g/cm³) of finish part | 1.383 | 1.362 | 1.389 |
| Container forming (times) up to staining of mold | 15,000 | 4,000 | 13,000 |
| Deformation of bottle finish part | None | Deformed | Deformed |
| Leakage of content | none | Leakage found | Leakage found |
| Haze (%) of bottle | 1.5 | 6.3 | Non-transparent |
| Fine particle content (ppm) | 300 | 0.02 | 800 |
| Polyacetal content (ppm) | 100 | — | 2000 |

According to the polyester resin of the present invention, molds such as a stretch blow mold, a heat setting mold, a vacuum forming mold and the like are less stained in sheet forming, bottle forming and the like, so that forming can be continued for a long time to easily produce a multitude of formed articles with superior transparency. As a result, a hollow article, a sheet product, an oriented film and a packaging material having superior transparency, heat resistance and mechanical properties, less residual strange taste and odor, and having superior flavor retention property can be obtained. In addition, the production method of the polyester resin of the present invention reduces the stains and clogging of a treatment tank and pipes.

This application is based on patent application Nos. 240956/1998, 240960/1998, 240963/1998 and 14701/1999 filed in Japan, the contents of which are hereby incorporated by reference.

What is claimed is:

1. A polyester resin comprising a polyester resin chip (A) and a polyester resin fine particle (B), which has the same composition as the (A) and which passes through a 10.5 mesh screen, in a proportion of 0.1–300 ppm, wherein a cyclic trimer increases by not more than 0.30 wt % upon melting at a temperature of 290° C. for 60 minutes.

2. A polyester resin characterized in that a cyclic trimer increases by not more than 0.30 wt % upon melting at a temperature of 290° C. for 60 minutes, the polyester resin satisfies at least one of the following formulas (1) to (4):

(1) $0.001 \leq N \leq 5$ (ppm)
(2) $0.001 \leq C \leq 5$ (ppm)
(3) $0.001 \leq M \leq 5$ (ppm)
(4) $0.001 \leq S \leq 5$ (ppm)

where N is a sodium content, C is a calcium content, M is a magnesium content and S is a silicon content, and the total of these contents is not more than 10 ppm.

3. The polyester resin of claim 2, wherein the polyester resin comprises a polyester resin chip (A) and a polyester resin fine particle (B) which has the same composition as the (A) and which passes through a 10.5 mesh screen, in a proportion of 0.1–300 ppm.

4. The polyester resin of claim 1, wherein the polyester resin chip (A) and the polyester resin fine particle (B) are polyester resins comprising a polyolefin resin or a polyacetal resin, or a polyolefin resin and a polyacetal resin in a proportion of 0.1 ppb–1,000 ppm.

5. The polyester resin of claim 3, wherein the polyester resin chip (A) and the polyester resin fine particle (B) are polyester resins comprising a polyolefin resin or a polyacetal resin, or a polyolefin resin and a polyacetal resin in a proportion of 0.1 ppm–1,000 ppm.

6. The polyester resin of claim 1, which is a linear polyester resin comprising ethylene terephthalate, which is a main repeat unit, in a proportion of not less than 85 mol %.

7. The polyester resin of claim 2, which is a linear polyester resin comprising ethylene terephthalate, which is a main repeat unit, in a proportion of not less than 85 mol %.

8. The polyester resin of claim 1, which is a linear polyester resin comprising ethylene-2,6-naphthalate, which is a main repeat unit, in a proportion of not less than 85 mol %.

9. The polyester resin of claim 2, which is a linear polyester resin comprising ethylene-2,6-naphthalate, which is a main repeat unit, in a proportion of not less than 85 mol %.

10. The polyester resin of claim 1, which is obtained by subjecting, to a water treatment, a polyester resin obtained by mainly using aromatic dicarboxylic acid or its ester-forming derivative, and glycol or its ester-forming derivative as starting materials, and a Ge compound or a Ti compound, or a Ge compound and a Ti compound as a catalyst.

11. The polyester resin of claim 2, which is obtained by subjecting to a water treatment, a polyester resin obtained by mainly using aromatic dicarboxylic acid or its ester-forming derivative, and glycol or its ester-forming derivative as starting materials, and a Ge compound or a Ti compound, or a Ge compound and a Ti compound as a catalyst.

12. The polyester resin of claim 1, which is obtained by treating a polyester resin chip with treatment water at 40–120° C. in a treatment tank, the water comprising a polyester resin fine particle, which passes through a 20 mesh screen but does not pass through a 100–120 μm pore size glass filter, in a proportion of 1–1,000 ppm.

13. The polyester resin of claim 2, which is obtained by treating a polyester resin chip with treatment water in a treatment tank, the water satisfying at least one of the following formulas (1) to (4):

(1) $0.001 \leq N \leq 1.0$ (ppm)
(2) $0.001 \leq C \leq 0.5$ (ppm)
(3) $0.001 \leq M \leq 0.5$ (ppm)
(4) $0.01 \leq S \leq 2.0$ (ppm)

wherein N is a sodium content, C is a calcium content, M is a magnesium content and S is a silicon content, and the total of these contents is not more than 3.0 ppm.

14. The polyester resin of claim 12, wherein the treatment water for the water treatment contains particles having a particle size of 1–25 μm in a proportion of 1–50,000 particles/10 ml and is introduced from outside the system.

15. The polyester resin of claim 13, wherein the treatment water for the water treatment contains particles having a particle size of 1–25 μm in a proportion of 1–50,000 particles/10 ml and is introduced from outside the system.

16. A resin mixture comprising the polyester resin of claim 1, and a polyolefin resin or a polyacetal resin, or a polyolefin resin and a polyacetal resin in a proportion of 0.1 ppb–1,000 ppm.

17. A resin mixture comprising the polyester resin of claim 3, and a polyolefin resin or a polyacetal resin, or a polyolefin resin and a polyacetal resin in a proportion of 0.1 ppb–1,000 ppm.

18. The resin mixture of claim 16, wherein the polyolefin resin and the polyacetal resin comprise particles having a particle size of 0.1–10 μm.

19. A production method of a polyester resin, comprising treating a polyester resin chip with water in a treatment tank wherein the treatment water discharged with polyester resin chips is controlled to make the proportion of a polyester resin fine particle, which passes through a 20 mesh screen but does not pass through a 100–120 μm pore size glass filter 1–1,000 ppm.

20. A production method of a polyester resin comprising treating a polyester resin chip with water in a treatment tank, wherein the treatment water is controlled such that the treatment water discharged from the treatment tank with polyester resin chips satisfies at least one of the following formulas (1) to (4):

(1) $0.001 \leq N \leq 10.0$ (ppm)
(2) $0.001 \leq C \leq 5.0$ (ppm)
(3) $0.001 \leq M \leq 2.0$ (ppm)
(4) $0.01 \leq S \leq 10.0$ (ppm)

wherein N is a sodium content, C is a calcium content, M is a magnesium content and S is a silicon content, and the total of these contents is not more than 20 ppm.

21. A production method of a polyester resin comprising treating a polyester resin chip with water in a treatment tank, wherein the treatment water containing particles having a particle size of 1–25 μm in a proportion of 1–50,000 particles/10 ml is introduced from outside the system for the water treatment.

22. The production method of claim 21, wherein the treatment water discharged with polyester resin chips from the treatment tank contains a polyester resin fine particle which passes through a 20 mesh screen but does not pass through a 100–120 μm pore size glass filter, in a proportion of 1–1,000 ppm, and satisfies at least one of the following formulas (1) to (4):

(1) $0.001 \leq N \leq 10.0$ (ppm)
(2) $0.001 \leq C \leq 5.0$ (ppm)
(3) $0.001 \leq M \leq 2.0$ (ppm)
(4) $0.01 \leq S \leq 10.0$ (ppm)

wherein N is a sodium content, C is a calcium content, M is a magnesium content and S is a silicon content, and the total of these contents is not more than 20 ppm.

23. The production method of claim 19, wherein the treatment water discharged with polyester resin chips from the treatment tank is at least partially returned to the treatment tank.

24. The production method of claim 20, wherein the treatment water discharges with polyester resin chips from the treatment tank is at least partially returned to the treatment tank.

25. The production method of claim 22, wherein the treatment water discharged with polyester resin chips from the treatment tank is at least partially returned to the treatment tank.

26. The production method of claim 23, wherein the treatment water to be returned to the treatment tank, which contains a polyester resin fine particles which pass through a 20 mesh screen but do not pass through a 100–120 μm pore size glass filter, is passed through a filter selected from the group consisting of a belt filter, a bag filter and a centrifugal filter to control the polyester resin fine particle content.

27. The production method of claim 24, wherein the treatment water discharged from the treatment tank is applied to an ion exchange treatment and returned to the treatment tank.

28. The production method of claim 21, wherein the water to be introduced from outside the system is passed through a filter selected from the group consisting of a belt filter, a bag filter, a cartridge filter and a centrifugal filter to control particles in the water having a particle size of 1 25 μm to 1–50,000 particles/10 ml.

29. A hollow article of the formed polyester resin of claim 1.

30. A hollow article of the formed polyester resin of claim 2.

31. A hollow article of the formed resin mixture of claim 16.

32. A hollow article of the formed resin mixture of claim 17.

* * * * *

UNITED STATES PATENT AND TRADEMARK OFFICE
CERTIFICATE OF CORRECTION

PATENT NO. : 6,129,961
DATED : October 10, 2000
INVENTOR(S) : Sonoda et al.

It is certified that errors appear in the above-identified patent and that said Letters Patent is hereby corrected as shown below:

ON THE TITLE PAGE

IN THE INVENTORS:

On the first page, the last inventor's city: "Shiga-gun" should read --Shiga--.

IN THE ABSTRACT:

On the first page, line 10: "polyeser" should read --polyester--.

IN THE CLAIMS:

In Claim 5, column 39, line 13: "0.1 ppm" should read --0.1 ppb--.

In Claim 24, column 40, line 57: "discharges" should read --discharged--.

In Claim 28, column 42, line 1: "1 25 $\mu$m" should read --1 - 25 $\mu$m--.

Signed and Sealed this

Eighth Day of May, 2001

Attest:

NICHOLAS P. GODICI

*Attesting Officer*    *Acting Director of the United States Patent and Trademark Office*